(12) United States Patent
Blacha et al.

(10) Patent No.: US 11,498,689 B2
(45) Date of Patent: Nov. 15, 2022

(54) ATTACHMENT FOR SUSPENDING AN AIRCRAFT ENGINE

(71) Applicant: AIRBUS HELICOPTERS DEUTSCHLAND GMBH, Donauworth (DE)

(72) Inventors: Martin Blacha, Donauworth (DE); Marc Schelcher, Augsburg (DE); Adriana Garcia Rios, Munich (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 484 days.

(21) Appl. No.: 16/655,798

(22) Filed: Oct. 17, 2019

(65) Prior Publication Data

US 2020/0180773 A1    Jun. 11, 2020

(30) Foreign Application Priority Data

Dec. 6, 2018 (EP) .................................... 18400035

(51) Int. Cl.
  *B64D 27/26* (2006.01)
  *F02C 7/20* (2006.01)
  *F01D 25/28* (2006.01)

(52) U.S. Cl.
  CPC ............... *B64D 27/26* (2013.01); *F02C 7/20* (2013.01); *B64D 2027/266* (2013.01); *B64D 2027/268* (2013.01); *F01D 25/28* (2013.01); *F05D 2240/90* (2013.01); *F05D 2300/603* (2013.01)

(58) Field of Classification Search
  CPC .............. B64D 27/26; B64D 2027/266; B64D 2027/268; F02C 7/20; F01D 25/28; F05D 2240/90; F05D 2300/603; Y02T 50/40
  See application file for complete search history.

(56) References Cited

U.S. PATENT DOCUMENTS

| 4,725,019 A | 2/1988 | White |
| 2002/0033796 A1 | 3/2002 | Chatenet |
| 2005/0067528 A1* | 3/2005 | Loewenstein .......... B64D 27/26 244/54 |

(Continued)

FOREIGN PATENT DOCUMENTS

| CA | 2629069 A1 | 5/2007 |
| EP | 0455355 A1 | 11/1991 |

(Continued)

OTHER PUBLICATIONS

European Search Report for European Application No. EP 18400035. 4, Completed by the European Patent Office, dated Apr. 17, 2019, 9 pages.

*Primary Examiner* — Gerald L Sung
*Assistant Examiner* — Rene D Ford
(74) *Attorney, Agent, or Firm* — Brooks Kushman P.C.

(57) ABSTRACT

An attachment for attaching an aircraft engine with a first receiving element to an aircraft structure with a second receiving element may include at least three fasteners and a stacked layer. Stacked layer may include at least two sheets, at least three holes through the stacked layer, a first connecting portion that includes a first hole of the at least three holes, a second connecting portion that includes second and third holes of the at least three holes, and a suspension portion that is located between the first connecting portion and the second connecting portion.

20 Claims, 14 Drawing Sheets

(56) References Cited

U.S. PATENT DOCUMENTS

| | | | |
|---|---|---|---|
| 2008/0230675 A1 | 9/2008 | Audart-Noel et al. | |
| 2009/0032673 A1* | 2/2009 | Dron | B64D 27/26 248/557 |
| 2009/0108127 A1* | 4/2009 | Cazals | B64D 27/26 244/54 |
| 2009/0308972 A1 | 12/2009 | Foster | |
| 2010/0170980 A1 | 7/2010 | Haramburu et al. | |
| 2010/0181419 A1* | 7/2010 | Haramburu | B64D 27/26 244/54 |
| 2011/0114786 A1* | 5/2011 | Guillet | B64D 27/26 244/54 |
| 2012/0018576 A1 | 1/2012 | Bonnet et al. | |
| 2014/0084129 A1* | 3/2014 | Sandy | B64D 27/26 248/554 |
| 2014/0183298 A1 | 7/2014 | Brochard et al. | |
| 2015/0048201 A1* | 2/2015 | Takeuchi | B64D 27/26 244/54 |
| 2016/0122029 A1 | 5/2016 | Serra et al. | |
| 2017/0106989 A1* | 4/2017 | Takeuchi | B64D 27/26 |

FOREIGN PATENT DOCUMENTS

| | | |
|---|---|---|
| EP | 1188668 A1 | 3/2002 |
| EP | 2410202 A1 | 1/2012 |
| EP | 3015368 A1 | 5/2016 |
| FR | 2891253 A1 | 3/2007 |
| WO | 2008155376 A1 | 12/2008 |

* cited by examiner

ATTACHMENT FOR SUSPENDING AN AIRCRAFT ENGINE

CROSS-REFERENCE TO RELATED APPLICATIONS

This application claims priority to European patent application No. EP 18400035.4 filed on Dec. 6, 2018, the disclosure of which is incorporated in its entirety by reference herein.

BACKGROUND OF THE INVENTION

(1) Field of the Invention

The present embodiments relate to an attachment for attaching two apparatuses with each other that may move within a limited range relative to each other and, more particularly, to an attachment for attaching an aircraft engine to an aircraft structure.

(2) Description of Related Art

Aircrafts usually have a mounting system for mounting aircraft engines to the remaining aircraft structure. Such a mounting system often includes an attachment that allows, for example, to rigidly connect the aircraft engine with the remaining aircraft structure and to transfer forces between the aircraft engine and the aircraft structure. For example, aircraft engines of airplanes are generally attached to the wing or fuselage by means of an attachment to which the aircraft engine is connected through engine and thrust force transfer connecting elements.

Generally, such an attachment enables the mounting of an aircraft engine under the wing, above the wing, or on an aft portion of a fuselage of the aircraft. For example, in a statically determinate suspension under the wing, the loads between aircraft engine and aircraft are transmitted by attachments that work with tension/compression stresses. The attachments are fixed, on one side, to a beam secured to the structure of the aircraft, and, on the other side, to fittings on the aircraft engine casing.

Some attachments have link rods with ball joint connections at their extremities that connect the link rods with the beam on the one side and to the fittings on the other side such that loads can be transmitted only along the axis of the rods. The loads that act on these attachments include the aircraft engine torque, the aircraft engine weight, and the aircraft engine thrust.

In order to reduce the vibrations and noise caused by the operating of the aircraft engines and to improve the structural integrity of the aircraft, it is well-known in practice to combine suspension means with the attachment systems.

Document EP 2 410 202 A1 describes a device having first and second elements including connecting ends connected to bodies, e.g. engine mounting structure and turbojet engine, respectively. The elements have respective tubular portions extending along a longitudinal axis. The tubular portions are integrated by complementary tubular portions extending along the axis, from one of the tubular portions of the corresponding element and around the other tubular portion. Each portion has a surface having identical value, in a cross-section of the longitudinal axis. An independent claim is also included for an assembly comprising bodies and a connecting device.

Document US 2014/0183298 A1 describes a linking device that includes two hinge pins and having flexibility allowing vibrations between two shafts to be filtered. The device includes a stack of plates connected to one another by layers of elastomer material. Plates of a first type are coupled to one of the shafts in relation to the movements parallel to the plates, while the plates of a second type are coupled to the other shaft in relation to the movements parallel to the plates, so as to allow relative movement of the shafts parallel to the plates. This linking device may be used in particular as a connecting rod, spreader beam or three-point shackle used in connecting a turbine engine to a pylon in a propulsion system of an aircraft such as an airplane.

Document US 2009/0308972 A1 describes an engine mounting apparatus that includes thrust struts, a balance yoke, and primary and secondary mount blocks. The thrust struts are connected to the balance yoke and the primary mount block has at least one thrust load connection connectable to the balance yoke for transferring thrust loads from an engine during normal operation of the engine mounting apparatus. The engine mounting apparatus is, characterised in that the secondary mount block is connected to the balance yoke via at least one thrust load catcher connection, the at least one thrust load catcher connection being arranged to be unloaded during normal operation of the engine mounting arrangement and to transfer the thrust loads from the engine in the event of a failure condition of the primary mount block.

Document WO 2008/155376 A1 describes a pylon for coupling an engine for an aircraft comprising a rigid structure forming a casing and a system for mounting the engine mounted on the structure and comprising a rear engine attachment comprising an attachment body on which at least one clevis is articulated also designed to be articulated on the engine, the system for mounting the engine also comprising a device for absorbing the thrust forces generated by the engine, comprising two lateral link rods connected to a rudder control bar mounted articulated relative to the casing. According to the invention, the attachment body forms the said rudder control bar, the body being mounted articulated relative to the casing with the aid of an articulation axis system.

Documents CA 2 629 096 A1, FR 2 891 253 A1, NO 20014514 A and U.S. Pat. No. 4,725,019 A all describe an attachment for an aircraft engine assembly. Some of these documents describe attachments with rubber materials which are loaded in shear. Other documents describe attachments that includes a beam with plates that are disposed transversely to an attachment plane axis. The attachment that is described in the documents sometimes includes isolation material between the plates. However, the plates only establish a fail-safe design and do not provide enough flexibility to absorb any vibrations or compensate for thermal movement. Yet other documents describe attachments with floating pin connections or attachments that are not flexible in bending and transfer significant out-of-plane loads.

Most of the aforementioned documents describe an attachment in form of a purely fail-safe arrangement of flat single parts that partly use spherical bearings to solve the flexibility and/or movability issue between an aircraft engine and the remaining aircraft structure.

BRIEF SUMMARY OF THE INVENTION

In other words, the solutions described in the aforementioned documents only establish a fail-safe design and do not create enough flexibility for extreme bending capabilities.

Based on the limitations and drawbacks of the prior art, an objective is to provide an attachment for attaching an aircraft engine with the remaining aircraft structure. The attachment should be able to transfer the high forces and moments coming from the aircraft engine, while offering a lower stiffness out-of-plane. Moreover, the attachment should have a simple and light-weight design, and should be easy to install.

This objective is solved by an apparatus comprising the features of claim 1.

More specifically, an attachment for attaching an aircraft engine having a first receiving element to an aircraft structure having a second receiving element, comprises at least three fasteners and a stacked layer. The stacked layer comprises at least two sheets that are arranged parallel to a longitudinal axis of the attachment and at least three holes through the stacked layer that each extend in direction of a perpendicular axis that is perpendicular to the longitudinal axis. The stacked layer further comprises a first connecting portion that includes a first hole of the at least three holes, wherein the first hole receives a first fastener of the at least three fasteners that rigidly attaches the first connecting portion with the first receiving element. The stacked layer further comprises a second connecting portion that includes second and third holes of the at least three holes, wherein the second hole receives a second fastener of the at least three fasteners, wherein the third hole receives a third fastener of the at least three fasteners, and wherein the second and third fasteners rigidly attach the second connecting portion with the second receiving element. Furthermore, the stacked layer comprises a suspension portion that is located between the first connecting portion and the second connecting portion and that is semi elastic or viscoelastic deformable in a direction that is parallel to the perpendicular axis.

According to some embodiments, the stacked layer may have a varying shape and length.

According to some embodiments, the stacked layer may be fixed to the aircraft structure with at least two fasteners of the at least three fasteners and to the aircraft engine with at least one fastener of the at least three fasteners. The fasteners may be pins, screws, bolts and nuts, rivets, or any combination thereof.

According to some embodiments, the at least three fasteners may stack at least two sheets together.

According to some embodiments, the at least three fasteners may transfer forces and moments between the aircraft engine and the aircraft structure.

According to some embodiments, the at least two sheets may be flexible along the perpendicular axis.

According to some embodiments, the at least two sheets may be stiff along the longitudinal axis for transferring high forces and moments that are exerted on the aircraft engine.

According to some embodiments, the stacked layer may be bent and/or partly twisted along the perpendicular axis.

According to some embodiments, the stacked layer may control movement in direction of the sheet thickness, thereby providing advantages in case of a thermal mismatch between the aircraft structure and the aircraft engine.

According to some embodiments, the stacked layer may absorb vibrations between the aircraft engine and the aircraft structure.

According to some embodiments, the stacked layer may minimize tolerance requirements.

According to some embodiments, the stiffness of the stacked layer that is along both the longitudinal axis and the perpendicular axis may be adjustable. For example, the stiffness of the stacked layer may be adjusted by adjusting the number, the thickness, the material, the geometric shape, and/or the ratio of thickness to the width and/or the length of the at least two sheets, and/or the position of the at least three fasteners.

According to some embodiments, the at least three fasteners may be installed in bushings which keep the arrangement of sheets together.

According to some embodiments, the at least three fasteners may control a friction between the at least two sheets by controlling the tightness of each of the at least three fasteners, wherein the friction between the at least two sheets may provide a damping effect along the perpendicular axis.

According to some embodiments, a specific damping material may be installed between individual sheets to improve the damping effect along the perpendicular axis.

According to some embodiments, at least one of the at least two sheets may have a different thickness.

According to some embodiments, a sheet of the at least two sheets may consist of a different material, for example according to a requirement of chemical resistance, Young's modulus, or a predetermined temperature range.

According to some embodiments, the at least two sheets may be variously shaped (e.g., straight, curved, kinked, triangular, oval, round, rectangular, with or without one or more cut-outs, with or without roundings, or combinations thereof, etc).

According to some embodiments, the stacked layer may include simple shaped parts that do not require any manufacturing complexity and eliminate the need of spherical bearings which would otherwise result in more complex and expensive attachments.

According to some embodiments, the fasteners may include off-the-shelf pins and/or off-the-shelf bushings.

According to some aspects, the required space for the stacked sheets in combination with a potential diagonal or even tangential arrangement to a gearbox or engine may allow for a very close distance between the aircraft structure and the gearbox or engine respectively.

According to some aspects, the adaptability of the individual stiffness allows to almost completely remove constraint forces in case of hyper-static attachment designs or to reduce built-in stresses to a very low level. This allows for example to relief the challenging tolerance requirements for installation in the sensitive area of the gearbox or engine which simplifies the installation.

According to some aspects, the stacked layer may be kinked to cope with design space limitations and/or to achieve even more extreme values for the required stiffness in-plane and out-of-plane.

According to some aspects, buckling of the sheets can be used to avoid overloading of the gearbox, the engine, and/or the main structural parts, or to provide softness in case of a crash where a determined deceleration can help to decrease impact forces. In an extreme scenario, the plastic deformation after elastic buckling can be taken to dissipate energy. This may enable additional weight savings.

According to one aspect, the at least two sheets are made of composite materials.

According to one aspect, the suspension portion has a first stiffness in direction of the longitudinal axis and a second stiffness in direction of the perpendicular axis that is smaller than the first stiffness.

According to one aspect, the suspension portion further comprises an additional hole through the stacked layer that extends in direction of the perpendicular axis.

According to one aspect, the additional hole receives an additional fastener that controls the second stiffness.

According to one aspect, the additional hole receives an additional fastener that attaches a device to the suspension portion.

According to one aspect, the stacked layer is kinked between the first and second connecting portions.

According to one aspect, the first receiving element encompasses the stacked layer at the first connecting portion.

According to one aspect, the second receiving element encompasses the stacked layer at the second connecting portion.

According to one aspect, the attachment further comprises an additional stacked layer that comprises at least two additional holes, wherein a fourth hole of the at least two additional holes receives at least one of the first, second, or third fastener that couples the stacked layer with the additional stacked layer.

According to one aspect, the additional stacked layer is arranged parallel to the longitudinal axis, and the at least two additional holes are arranged parallel to the at least three holes of the stacked layer.

According to one aspect, the additional stacked layer is arranged between first and second prongs of the first receiving element, and the first fastener rigidly attaches the first connecting portion of the stacked layer with the first prong, the additional stacked layer and the second prong.

According to one aspect, fifth and sixth holes of the at least two additional holes of the additional stacked layer are aligned with the second and third hole of the stacked layer, and the second and third fasteners rigidly attach the second receiving element at the second connecting portion between the stacked layer and the additional stacked layer.

According to one aspect, a fifth hole of the at least two additional holes of the additional stacked layer is aligned with the first hole of the stacked layer, and the first fastener rigidly attaches the first receiving element at the first connecting portion between the stacked layer and the additional stacked layer.

According to the one aspect, the at least two sheets further comprise a sheet made from a damping material.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

FIG. 73 is a diagram of a plan view of the illustrative attachment of FIG. 7A that includes the stacked layer being encompassed by the receiving element in accordance with some embodiments.

Exemplary embodiments may be included in any apparatus with an engine in which vibrations and forces such as thermal movement coming from the engine should be absorbed. Examples of such apparatuses may include vehicles.

DETAILED DESCRIPTION OF THE INVENTION

Figure 1:
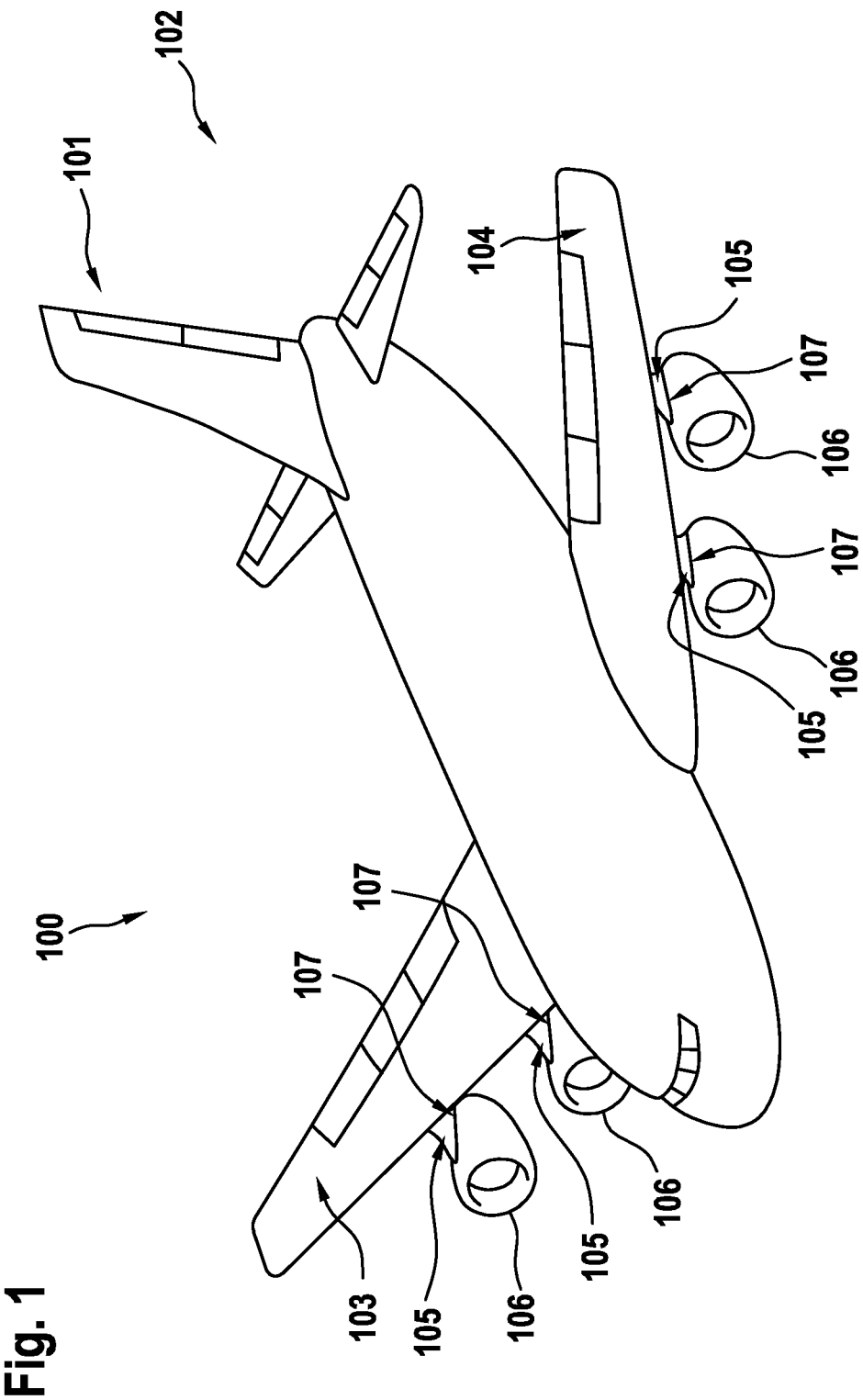
FIG. 1 is a diagram of an illustrative aircraft with an attachment in accordance with some embodiments.

FIG. 1 shows an example of a vehicle. A vehicle may be a car, a truck, a bus, a ship, or an aircraft such as an airplane, a multicopter, a helicopter, or any other flying vehicle with an engine. As shown in FIG. 1, the vehicle may be an aircraft 100. For purposes of simplicity and clarity, the aircraft 100 is hereinafter referred to as the "airplane" 100. As shown, airplane 100 may include rudder 101 and elevators 102 at a rear part of the airplane 100 and wings 103, 104. Wings 103, 104 may be equipped with aircraft structures 105 to which aircraft engines 106 are attached. Such aircraft structures 105 may include pylons, if desired. Each of aircraft engine 106 may be attached to aircraft structures 105 by means of attachments 107.

In some embodiments, aircraft engines 106 may be shaft engines such as in-line engines, v-type engines, horizontally opposed engines, H configuration engines, radial engines, rotary engines or any other reciprocating piston engines, turboprop engines, turboshaft engines, or any other turbine powered engines, reaction engines such as rocket engines, pulse jet engines, turbojet engines, turbofan engines, or any other jet engines, wankel engines, etc.

Some aircraft (e.g., helicopters or multicopters) may have gearboxes (e.g., between the aircraft engine and a rotor). If desired, such a gearbox may be attached to aircraft structures 105 by means of attachments 107.

For example, as shown in FIG. 1, each of aircraft engines 106 may include a pair of turbojet engines positioned under wings 103, 104. Each turbojet engine may have a nacelle that is attached to aircraft structure 105 by means of attachment 107. Aircraft engines 106 may be suspended beneath wings 103, 104 in an underwing configuration by means of attachments 107.

If desired, aircraft engine 106 may be attached laterally to the rear part of airplane 100. Such aircraft engine 106 may include a turbine aircraft engine, for example of the type having an unshrouded fan positioned at the aft. The turbine aircraft engine may have a nacelle that is attached to aircraft structure 105 by means of attachments 107.

Figure 2:
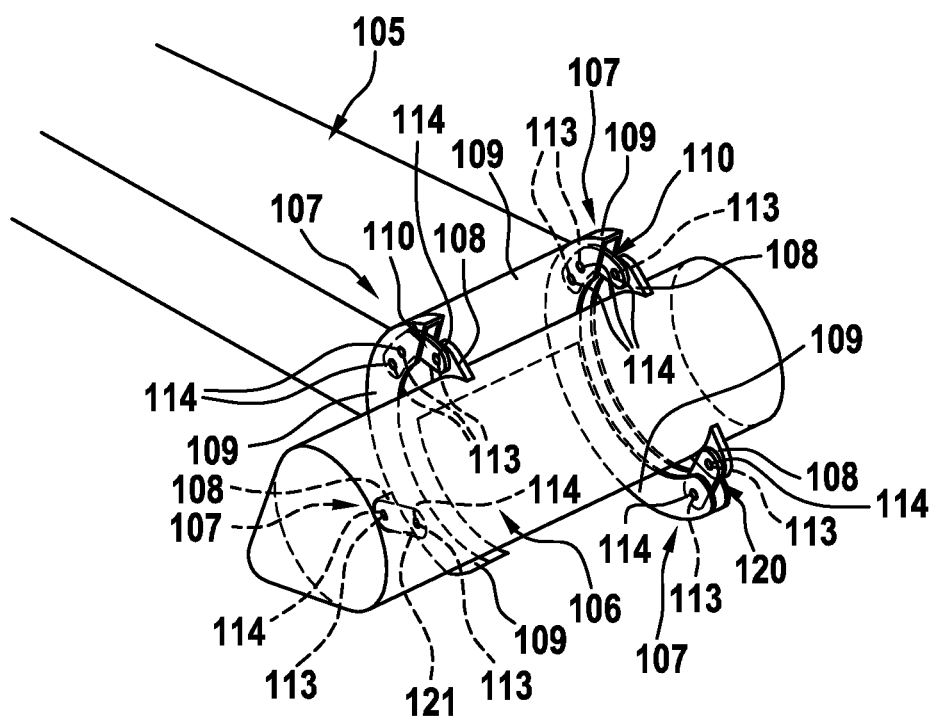
FIG. 2 is a diagram of an illustrative attachment in accordance with some embodiments.

FIG. 2 shows illustrative attachments 107 that may attach aircraft engine 106 having first receiving element 108 to aircraft structure 105 having second receiving element 109. In some embodiments, first receiving element 108 and/or second receiving element 109 may include beams, plates, brackets with or without prongs or any other means to which attachments 107 may be attached.

Attachments 107 may include coupling rod 120, 121 or stacked layer 110 that extends in direction of a longitudinal axis. Stacked layer 110 may include at least three holes 113 through stacked layer 110 that each extend in direction of a perpendicular axis that is perpendicular to the longitudinal axis.

As shown, coupling rods 120, 121 may include at least two holes 113. The use of coupling rods 120, 121 together with stacked layers 110 may improve the absorption of mechanical forces between aircraft engine 106 and aircraft structure 105, for example caused by thermal energy produced by aircraft engine 106.

If desired, as shown in FIG. 2, aircraft engine 106 may be attached to aircraft structure 105 with four attachments 107 (e.g., using two stacked layers 110 and two coupling rods 120, 121). However, aircraft engine 106 may be attached to aircraft structure 105 with any number of attachments 107. For example, aircraft engine 106 may be attached to aircraft structure 105 with one, two, three, five, six, or more attachments 107.

If desired, aircraft engine 106 may be attached to aircraft structure 105 with any combination of stacked layers 110 and/or coupling rods 120, 121. Coupling rods 120, 121 may be oriented in longitudinal direction (i.e., in direction of the longitudinal extension of aircraft engine 106), transversal direction (i.e., perpendicular to the longitudinal direction of aircraft engine 106), or in any other direction, which may enable the transfer of forces from aircraft engine 106 to aircraft structure 105.

As shown in FIG. 2, each attachment 107 may be attached with one first receiving element 108 at aircraft engine 106 and with one second receiving element 109 at aircraft structure 105. However, attachment 107 may be attached with any number of first receiving elements 108 at aircraft engine 106. Furthermore, attachment 107 may be attached with any number of second receiving elements 109 at aircraft structure 105.

In some embodiments, each of first receiving elements 108 may include one or more holes 113. The one or more holes 113 of first receiving element 108 may be aligned with one or more holes 113 of stacked layer 110 and/or coupling rod 120, 121. If desired, each one of the aligned one or more holes 113 may receive a fastener 114 that rigidly attaches stacked layer 110 and/or coupling rod 120, 121 with first receiving element 108.

In some embodiments, second receiving elements 109 may include two or more holes 113 when receiving stacked layer 110 or one or more holes 113 when receiving coupling rod 120, 121. The holes 113 of second receiving element 109 may be aligned with holes 113 of stacked layer 110 and/or coupling rod 120, 121. If desired, each one of the aligned holes 113 may receive a fastener 114 that rigidly attaches stacked layer 110 and/or coupling rod 120, 121 with second receiving element 109.

It should be noted that according to the present embodiments, each attachment 107 includes a stacked layer 110 and/or a coupling rod 120, 121 that is suitable for attaching an aircraft engine 106 having a first receiving element 108 to an aircraft structure 105 having a second receiving element 109. However, for simplicity and clarity of the drawings not all drawings are shown with each one of these elements. For instance, in FIG. 6A, attachment 107 is only shown with a stacked layer 110 attached to a second receiving element 109, but not to a first receiving element 108, and so on.

Figure 3A:
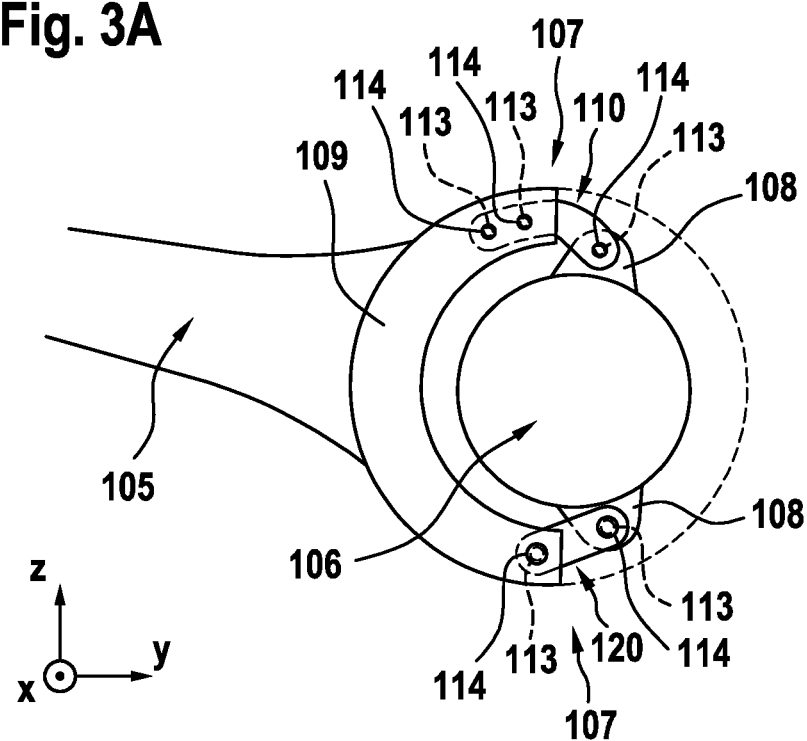
FIG. 3A is a diagram of a plan view of an illustrative attachment that attaches an aircraft engine to a fuselage of an aircraft in accordance with some embodiments.

FIG. 3A illustrates two attachments 107 that may attach aircraft engine 106 having first receiving elements 108 to aircraft structure 105 having second receiving elements 109. As an example, aircraft structure 105 may be part of the fuselage of an aircraft.

If desired, aircraft engine 106 may be attached laterally to the rear part of aircraft 100. In some embodiments, aircraft engine 106 may include a turbine engine, for example of the type having an unshrouded fan positioned at the aft. The turbine engine may have a nacelle that is attached to aircraft structure 105 by means of attachment 107.

The two attachments 107 may each include a stacked layer 110 that includes three holes 113 through stacked layer 110 that each extend in direction of perpendicular axis X that is perpendicular to longitudinal axis Y. As shown, for each of the two attachments 107, one fastener 114 through hole 113 may attach stacked layer 110 with first receiving element 108 of aircraft engine 106 and two fasteners 114 through holes 113 may attach stacked layer 110 with second receiving element 109 of aircraft structure 105.

Figure 3B:
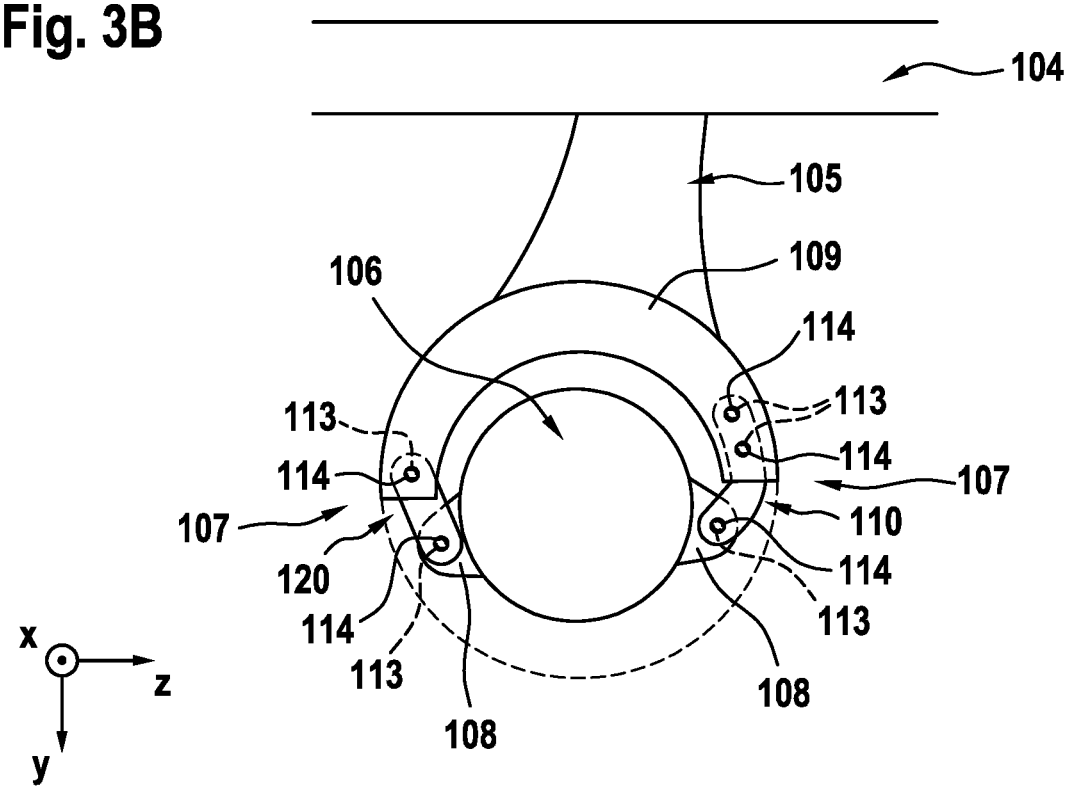
FIG. 3B is a diagram of a plan view of an illustrative attachment that attaches an aircraft engine under a wing of an aircraft in accordance with some embodiments.

FIG. 3B illustrates two attachments 107 that may attach aircraft engine 106 having first receiving elements 108 to aircraft structure 105 having second receiving elements 109. As an example, aircraft engine 106 may have a nacelle that is attached to aircraft structure 105 by means of attachments 107. As shown, aircraft engine 106 may be a turbojet engine that is suspended beneath wing 104 in an underwing configuration by means of attachments 107.

The two attachments 107 may each include a stacked layer 110 that includes three holes 113 through stacked layer 110 that each extend in direction of perpendicular axis X that is perpendicular to longitudinal axis Y. As shown, for each of the two attachments 107, one fastener 114 through hole 113 may attach stacked layer 110 with first receiving element 108 of aircraft engine 106 and two fasteners 114 through holes 113 may attach stacked layer 110 with second receiving element 109 of aircraft structure 105.

Figure 4:
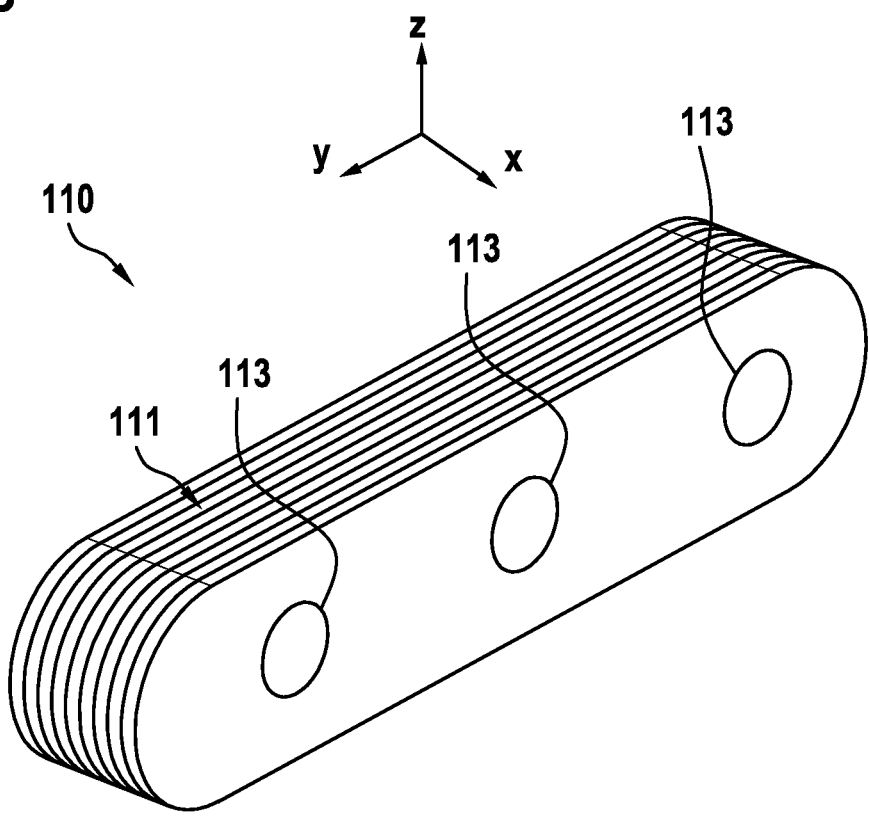
FIG. 4 is a diagram of an illustrative stacked layer in accordance with some embodiments.

FIG. 4 illustrates stacked layer 110 that may include at least two sheets 111 that are arranged parallel to longitudinal axis Y of attachment 107. As shown, stacked layer 110 may have three holes 113 that each extend in direction of perpendicular axis X that is perpendicular to longitudinal axis Y.

In some embodiments, sheets 111 may be made of composite materials. If desired, composite materials may include one or more constituent materials. For example, constituent materials may form a skin using a matrix material, which is sometimes also referred to as a matrix phase or a background material, and a transforming material, which is sometimes also referred to as a reinforcement or a reinforcing phase.

Examples for reinforcements include fibers and fabrics such as glass fibers, carbon fibers, aramid fibers, basalt fibers, flax, textiles, ceramic fibers, as well as carbon nanotubes, or any other reinforcement material that is suitable for forming a skin together with a matrix material. Examples for matrix materials include resins, polymers, ceramics, etc., or any other matrix material that is suitable for forming a skin together with a transforming material.

In some embodiments, sheets 111 may include a core between skins that is made from one or more constituent materials. For example, constituent materials for forming a core may include polyurethane (PU) foam, polyvinyl chloride (PVC) foam, or other foams, honeycomb cores, woods, just to name a few.

If desired, one or more sheets of sheets 111 may be made from a damping material. For example, one or more sheets of sheets 111 may be made from viscoelastic materials such as amorphous polymers, semi-crystalline polymers, biopolymers, or any other polymers, rubbers, bitumen, foams, graphite, magnesium, or a combination thereof.

Figure 5A:
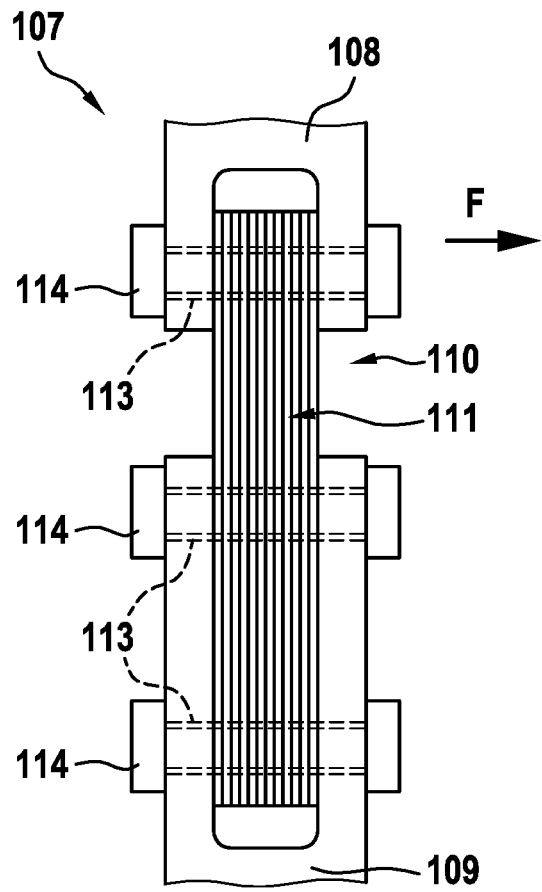
FIG. 5A is a diagram of a top view of an illustrative attachment with a stacked layer that is attached to first and second receiving elements in accordance with some embodiments.

FIG. 5A illustrates a top view of attachment 107 that may connect first and second receiving elements 108, 109. As shown, attachment 107 may include three fasteners 114 and stacked layer 110. Stacked layer 110 may include sheets 111, and three holes 113 through stacked layer 110.

In some embodiments, fasteners 114 may be used for creating non-permanent joints that can be removed or dismantled without damaging stacked layer 110. Fasteners 114 may be made of plastic, composite material, stainless steel, carbon steel, or alloy steel. Fasteners 114 may include bolts and nuts, rivets, screws, etc. If desired, fasteners 114 may include cables, hinges or springs for creating additional suspension between aircraft engine 106 and aircraft structure 105.

If desired, fasteners 114 may be used for creating permanent joints. Fasteners 114 may include fastening methods such as welding, crimping, soldering, brazing, taping, gluing, cementing, forcing friction, etc.

For simplicity and clarity of the drawings, the fasteners are shown with round heads. For instance, in FIG. 6A, 6B, or 6C, fasteners 114 are shown with round heads. However, fasteners 114 may have any kind of heads. For example, fasteners may have rectangular, hexagonal, or octagonal heads. If desired, fasteners 114 may have a socket cap. For example, fasteners 114 may have a rectangular, hexagonal, octagonal, or star-shaped socket cap.

Illustratively shown is also a distance between the shaft of fasteners 114 and holes 113. If desired, this distance may be small, thereby ensuring a tight fit of fasteners 114 in holes 113.

In some embodiments, loads and moments in direction of longitudinal axis Y and elevation axis Z may be transmitted by fasteners 114 that are under tension/compression stresses. If desired, fasteners 114 may include cables, hinges, or springs for creating additional suspension along perpendicular axis X of stacked layer 110 between first and second receiving elements 108, 109.

Stacked layer 110 may include first and second connecting portions. The first connecting portion may have a hole 113 that receives fastener 114 that rigidly attaches the first connecting portion with first receiving element 108. The second connecting portion may have two holes 113 that receive two fasteners 114 that rigidly attach the second connecting portion with second receiving element 109.

Fasteners 114 may hold sheets 111 together so that they cannot separate from each other. In some embodiments, fasteners 114 do not apply an axial force in direction of perpendicular axis X. In other words, fasteners 114 do not press sheets 111 together in direction of perpendicular axis X. If desired, fasteners do apply an axial force in direction of perpendicular axis X. The axial force may provide a damping effect, for example caused by energy dissipation from friction between sheets 111.

Stacked layer 110 may include a suspension portion that is located between the first and second connecting portions. The suspension portion may be very stiff and non-deformable in a direction that is parallel to longitudinal axis Y and in a direction that is parallel to elevation axis Z. If desired, the suspension portion may be semi elastic and/or viscoelastic deformable in a direction that is parallel to perpendicular axis X. In FIG. 5A, the suspension portion is shown in a non-deformed state.

In some embodiments, the forces that result from vibrations and/or thermal movement of an aircraft engine (e. g., aircraft engine 106 of FIG. 2, FIG. 3A, or FIG. 3B), and that are directed parallel to perpendicular axis X, may apply a load to the first connecting portion of stacked layer 110. The first connecting portion may transmit these forces to the second connecting portion over the suspension portion. The transmission of the forces over the suspension portion may cause a shearing deformation of sheets 111, the amplitude of which depends on the intensity of the forces.

Figure 5B:
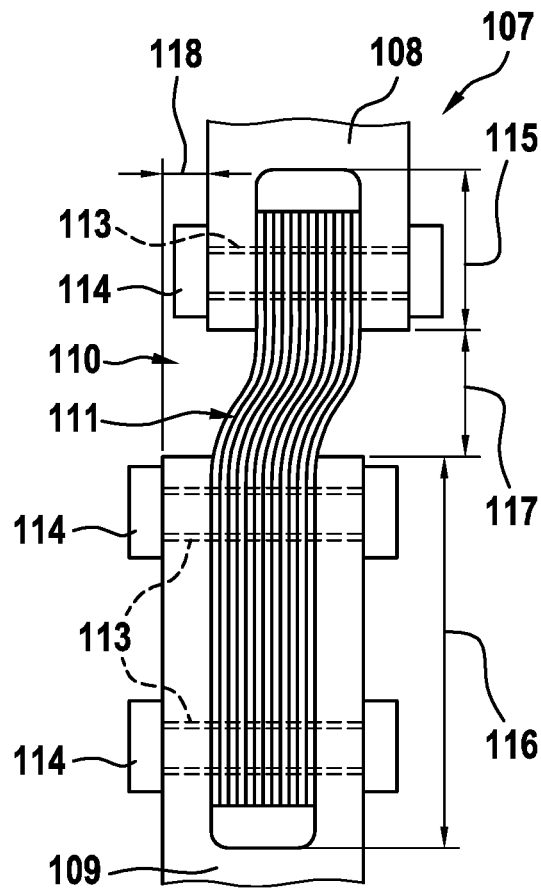
FIG. 5B is a diagram of a top view of an illustrative attachment that includes a stacked layer with a suspension portion that is in a semi elastic and/or viscoelastic deformed position in accordance with some embodiments.
Figure 5B:
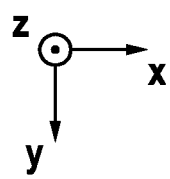
Figure 5B:
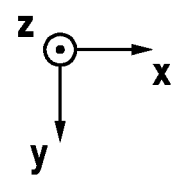

FIG. 5B illustrates attachment 107 that includes three fasteners 114 and stacked layer 110 with suspension portion 117 in a semi elastic and/or viscoelastic deformed state. Stacked layer 110 may include sheets 111, three holes 113 through stacked layer 110, first connecting portion 115 that includes a hole 113 that receives a fastener 114, second connecting portion 116 that includes two holes 113 that receive two fasteners 114, and suspension portion 117 that may be located between first connecting portion 115 and second connecting portion 116.

Fastener 114 through hole 113 in first connecting portion 115 may rigidly attach first connecting portion 115 with first receiving element 108. Fasteners 114 through holes 113 in second connecting portion 116 may rigidly attach second connecting portion 116 with second receiving element 109.

According to some embodiments, the forces that result from vibrations and/or thermal movement of an aircraft engine (e. g., aircraft engine 106 of FIG. 2, FIG. 3A, or FIG. 3B) with first connecting element 108 may apply loads to first connecting portion 115 of stacked layer 110. First connecting portion 115 may transmit these forces to second connecting portion 116 over suspension portion 117. The transmission of the forces to suspension portion 117 may cause a shearing deformation of stacked layer 110, resulting in displacement 118, the amplitude of which may depend on the intensity of the forces.

If desired, suspension portion 117 may be non-deformable in a direction parallel to longitudinal axis Y and in a direction parallel to elevation axis Z. Suspension portion 117 may be semi elastic and/or viscoelastic deformable in a direction that is parallel to perpendicular axis X. For example, suspension portion 117 may have a first stiffness in direction of longitudinal axis Y and a second stiffness in direction of perpendicular axis X that is smaller than the first stiffness.

As an example, consider the forces that are exerted in direction of both longitudinal axis Y and elevation axis Z of attachment 107, such as weight, lateral loads, and thrust of aircraft engine. The algebraic sum of the moments caused by these forces may provide a bending moment that acts on suspension portion 117 in a direction that is parallel to perpendicular axis X. If desired, suspension portion 117 may be semi elastic and/or viscoelastic deformable parallel to perpendicular axis X and bend and/or twist about perpendicular axis X of stacked layer 110.

If desired, depending on the direction of the forces that result from vibrations and/or thermal movement of an aircraft engine, deformation of suspension portion 117 in direction of perpendicular axis X may cause connecting portions 115, 116 to move relative to each other from their respective positions.

Figure 6A:
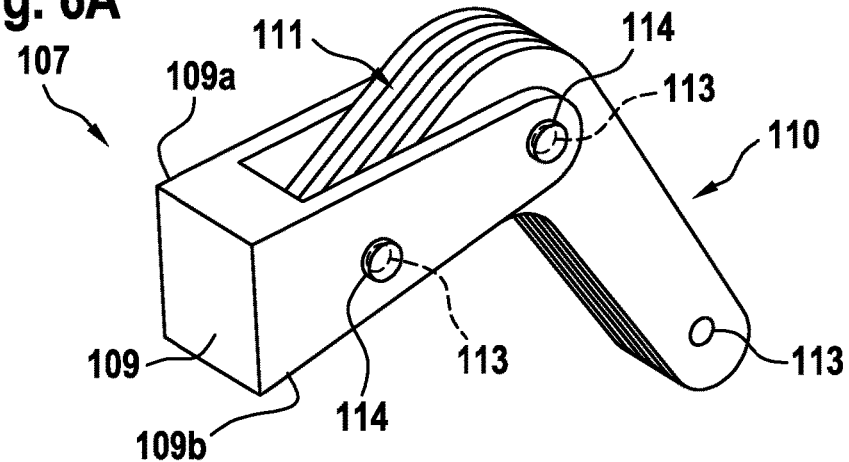
FIG. 6A is a diagram of an illustrative attachment having a stacked layer with kinked-shaped sheets in accordance with some embodiments.

FIG. 6A illustrates attachment 107 with a stacked layer 110 of kinked sheets 111 in accordance with some embodiments. Sheets 111 may be arranged parallel to a longitudinal axis (e. g., longitudinal axis Y of FIG. 6C). If desired, sheets 111 may be kinked in a direction that is parallel to an elevation axis (e.g., elevation axis Z of FIG. 6C).

As shown, attachment 107 may include fasteners 114 and a stacked layer 110 with three holes 113 that each extend in a direction parallel to an axis that is perpendicular to the longitudinal axis and the elevation axis (e. g., perpendicular axis X of FIG. 6O).

Receiving element 109 may include two prongs 109a, 109b. Stacked layer 110 may be arranged between these two prongs 109a, 109b. In other words, receiving element 109 may encompass stacked layer 110. Prongs 109a, 109b may be attached to stacked layer 110. For example, two of the three holes 113 of stacked layer 110 may each receive a fastener 114 that rigidly attaches stacked layer 110 with receiving element 109.

In some embodiments, stacked layer 110 may be attached to an aircraft structure (e. g., aircraft structure 105 of FIG. 2, FIG. 3A, or FIG. 38) with receiving element 109 and to an aircraft engine (e. g., aircraft engine 106 of FIG. 2, FIG. 3A, or FIG. 3B) with another receiving element (e.g., first receiving element 108 of FIG. 5A or FIG. 5B).

For example, the other receiving element may receive a fastener that rigidly attaches stacked layer 110 with the other receiving element at one end of stacked layer 110. Receiving element 109 may receive two fasteners that rigidly attach stacked layer 110 with receiving element 109 at the other end of stacked layer 110.

If desired, the forces that result from vibrations and/or thermal movements and that are directed to both the longitudinal axis and the elevation axis Z of attachment 107 (e. g., longitudinal axis Y and elevation axis Z of FIG. 6C) may apply loads to stacked layer 110 via the other receiving element. Stacked layer 110 may transmit these forces to the aircraft structure (e. g., aircraft structure 105 of FIG. 2, FIG. 3A or FIG. 3B) over receiving element 109. The transmission of said forces causes a shearing deformation of stacked layer 110 in direction of the perpendicular axis (e.g., perpendicular axis X of FIG. 6C), the amplitude of which depends on the intensity of the forces.

For example, as shown in FIG. 6A, stacked layer 110 may be kinked between the hole at which the other receiving element may be attached and receiving element 109 (e. g., first and second receiving elements 108, 109 of FIG. 5A or FIG. 5B). The kinked configuration of stacked layer 110 may allow the loads from an aircraft engine with the other receiving element to propagate through a wave connection and allow a compressive load to be applied at one point.

In some embodiments, sheets 111 of stacked layer 110 may be have the same size at the kink and at the ends. As shown, stacked layer 110 may be larger at the kink than at the ends.

Figure 6B:
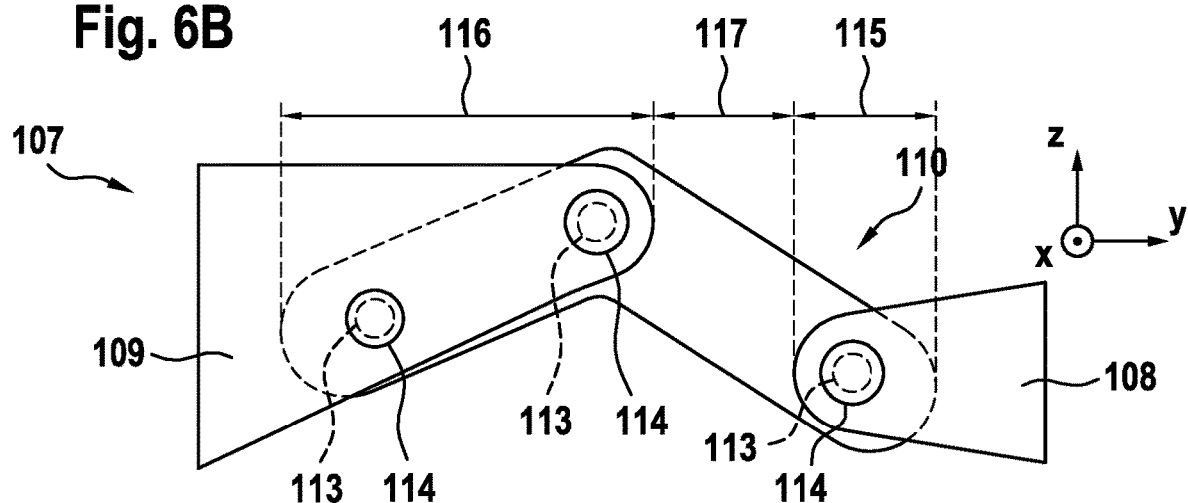
FIG. 6B is a diagram of a plan view of the illustrative attachment of FIG. 6A having the stacked layer with kinked-shaped sheets in accordance with some embodiments.

FIG. 6B shows a plan view of the illustrative attachment 107 of FIG. 6A having stacked layer 110 with kinked-shaped sheets. Stacked layer 110 may include three holes 113 through stacked layer 110 that each extend in direction of perpendicular axis X. If desired, stacked layer 110 may be divided into first connecting portion 115, second connecting portion 116, and suspension portion 117.

First connecting portion 115 may include one hole 113 that receives fastener 114 that rigidly attaches first connecting portion 115 with first receiving element 108. Second connecting portion 116 may include two holes 113 that are adapted to each receive a fastener 114. Fasteners 114 may rigidly attach second connecting portion 116 with second receiving element 109. Suspension portion 117 may be located between first connecting portion 115 and second connecting portion 116.

For example, as shown in FIG. 6B, stacked layer 110 may be kinked between first and second connecting portions 115, 116. If desired, the sheets of stacked layer 110 may have the same size at the kink and at the ends. In some embodiments, stacked layer 110 may be larger at the kink than at the ends in a direction that is parallel to elevation axis Z. The kinked configuration of stacked layer 110 may allow the loads from an aircraft engine to propagate via first receiving element 108, through stacked layer 110 in a zig-zag way to second receiving element 109 and allow the compressive load to be applied at one point.

In other words, the forces that result from vibrations and/or thermal movement of an aircraft engine (e. g., aircraft engine 106 of FIG. 2, FIG. 3A or FIG. 3B) and that are directed to both longitudinal axis Y and elevation axis Z of attachment 107 may apply loads to first connecting portion 115 of stacked layer 110. First connecting portion 115 may transmit these forces to second connecting portion 116 over suspension portion 117. The transmission of the forces to suspension portion 117 may cause a shearing deformation of stacked layer 110 in direction of perpendicular axis X, the amplitude of which depends on the intensity of the forces.

If desired, suspension portion 117 may have a first stiffness in direction of longitudinal axis Y and a second stiffness in direction of perpendicular axis X that is smaller than the first stiffness in direction of longitudinal axis Y. Suspension portion 117 may be semi elastic and/or viscoelastic deformable in a direction that is parallel to perpendicular axis X.

Figure 6C:
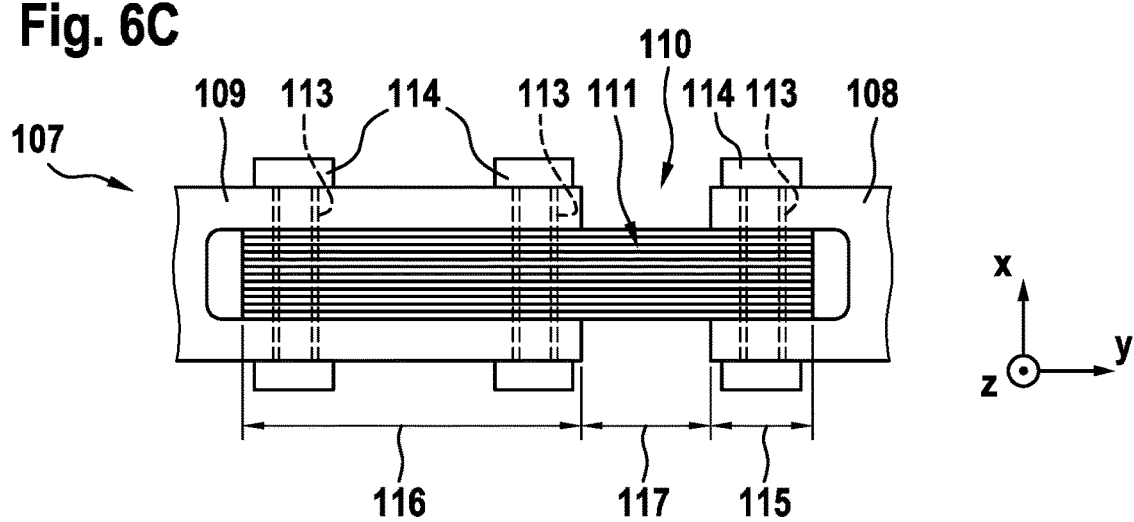
FIG. 6C is a diagram of a top view of the illustrative of the attachment of FIGS. 6A and 6B having the stacked layer with kinked-shaped sheets in accordance with some embodiments.

FIG. 6C illustrates a top view of attachment 107 of FIG. 6B that may connect first and second receiving elements 108, 109. Attachment 107 may include three fasteners 114 and stacked layer 110. Stacked layer 110 may include sheets 111, three holes 113 through stacked layer 110, first connecting portion 115, second connecting portion 116, and suspension portion 117.

First connecting portion 115 may include a hole 113 that receives a fastener 114. Second connecting portion 116 may include two holes 113 that receive two fasteners 114, and suspension portion 117 may be located between first connecting portion 115 and second connecting portion 116.

In some embodiments, first receiving element 108 may be part of an aircraft engine (e.g., aircraft engine 106 of FIG. 3A or 3B), and second receiving element 109 may be part of an aircraft structure (e.g., aircraft structure 105 of FIG. 3A or 3B). Loads and moments in direction of longitudinal axis Y and elevation axis Z from the aircraft engine may be transmitted by fasteners 114 that are under tension/compression stresses.

If desired, fasteners 114 may include cable, hinges or springs for creating additional suspension along perpendicular axis X of stacked layer 110, between first and second receiving elements 108, 109.

First and second connecting portions 115, 116 of stacked layer 110 may be rigidly attached to corresponding first and second receiving elements 108, 109. For example, first connecting portion 115 may receive one fastener 114 that rigidly attaches first connecting portion 115 with first receiving element 108. Second connecting portion 116 may receive two fasteners that rigidly attach second connecting portion 116 with second receiving element 109. First and second connecting portions 115, 116 may be characterized as portions of stacked layer 110 that are non-deformable in a direction that is parallel to perpendicular axis X.

In some embodiments, the forces that result from vibrations and/or thermal movement of an aircraft engine and that are directed to longitudinal axis Y and/or elevation axis Z of attachment 107 may apply loads via first receiving element 108 to first connecting portion 115 of stacked layer 110. First connecting portion 115 may transmit these forces to second connecting portion 116 over suspension portion 117. The transmission of the forces over suspension portion 117 may cause a shearing deformation of stacked layer 110 in direction of perpendicular axis X, the amplitude of which depends on the intensity of the forces.

If desired, suspension portion 117 may have a predetermined stiffness in direction of longitudinal axis Y and/or elevation axis Z and another predetermined stiffness in direction of perpendicular axis X that is smaller than the predetermined stiffness in direction of longitudinal axis Y. if desired, suspension portion 117 may be semi elastic and/or viscoelastic deformable in the direction that is parallel to perpendicular axis X.

As an example, consider the scenario in which stacked layer 110 is kinked between first and second connecting portions 115, 116. In this scenario, the kinked configuration of stacked layer 110 may allow an algebraic sum of the forces that are exerted in direction of perpendicular axis X of attachment 107 to be concentrated for acting in one point in direction of perpendicular axis X. Said concentrated forces may provide a bending moment on suspension portion 117 at one point. If desired, suspension portion 117 may bend and/or twist about perpendicular axis X of stacked layer 110.

Figure 7A:
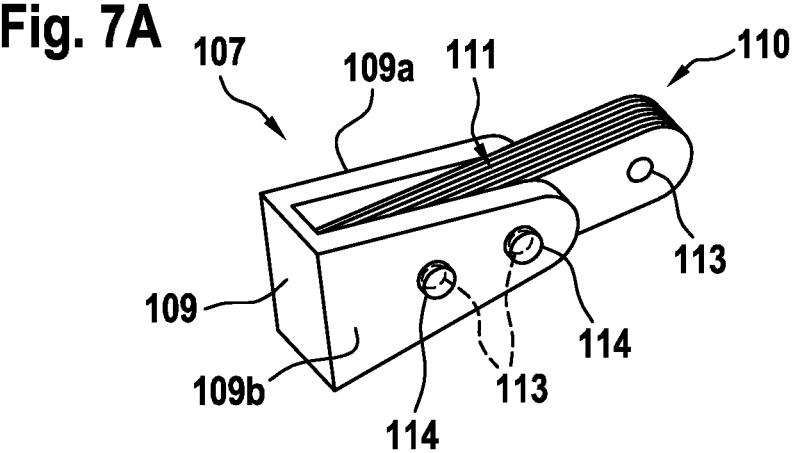
FIG. 7A is a diagram of an illustrative attachment that includes a stacked layer being encompassed by a receiving element in accordance with some embodiments.

FIG. 7A shows an illustrative attachment 107 that includes fasteners 114 and stacked layer 110 that is encompassed by receiving element 109. Stacked layer 110 may include sheets 111 that are arranged parallel to each other and three holes 113 through sheets 111 of stacked layer 110.

Receiving element 109 may encompass stacked layer 110 at a connecting portion. For example, receiving element 109 may include prongs 109a, 109b. Stacked layer 110 may be arranged between these prongs 109a, 109b. Fasteners 114 may rigidly attach stacked layer 110 with prongs 109a, 109b, if desired.

In some embodiments, stacked layer 110 may be attached to an aircraft structure (e. g., aircraft structure 105 of FIG. 3A) via receiving element 109 and to an aircraft engine (e. g., aircraft engine 106 of FIG. 3A) with another receiving element. The other receiving element may receive a fastener that rigidly attaches stacked layer 110 with the other receiving element at one end of stacked layer 110 as described in detail in FIGS. 3A and 3B. However, for simplicity and clarity of the drawings, the first receiving element has been omitted from the drawings. Second receiving element 109 may receive two fasteners that rigidly attach stacked layer 110 with second receiving element 109 at the other end of stacked layer 110.

For example, as shown in FIG. 7A, stacked layer 110 may have a straight shape. The straight configuration of stacked layer 110 may allow the loads that result from vibrations and/or thermal movement of an aircraft engine (e. g., aircraft engine 106 of FIG. 3A or 3B) to propagate through smooth load paths between sheets 111 and allow the compressive load to be spread in some manner over the length, or at least a significant length, of stacked layer 110.

Figure 7B:
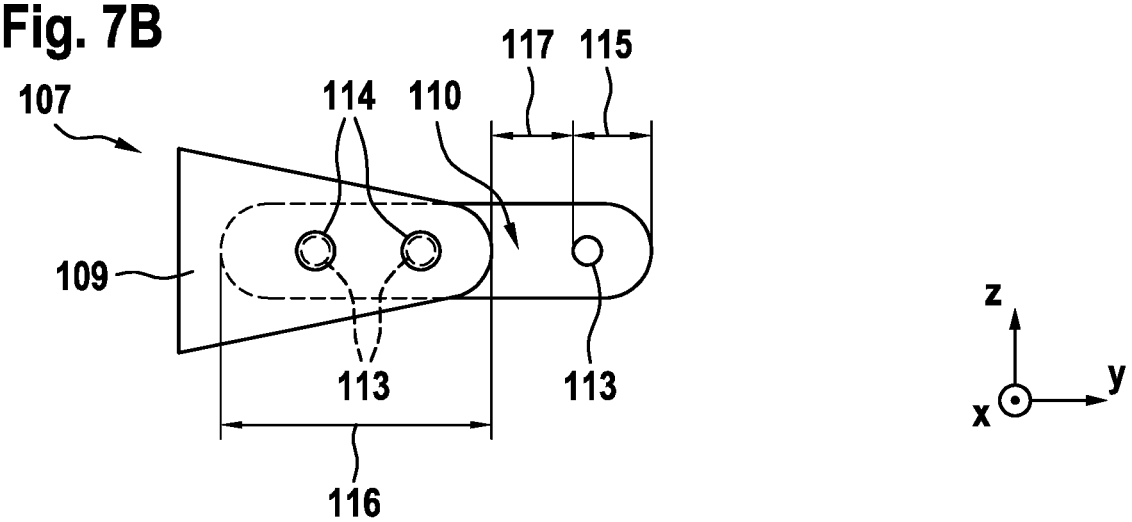
FIG. 7C is a diagram of a top view of the illustrative attachment FIGS. 7A and 73 that includes the stacked layer being encompassed by the receiving element of in accordance with some embodiments.

FIG. 7B illustrates a plan a view of attachment 107 of FIG. 7A. Attachment 107 may include fasteners 114 and stacked layer 110. Stacked layer 110 may include three holes 113 through stacked layer 110 that each extend in direction of perpendicular axis X, first connecting portion 115 that includes a hole 113, second connecting portion 116 that includes two holes 113 that receive two fasteners 114, and suspension portion 117 that may be located between first connecting portion 115 and second connecting portion 116.

First connecting portion 115 may be adapted to receive a fastener that rigidly attaches first connecting portion 115 with a first receiving element of an aircraft engine. Second connecting portion 116 may receive two fasteners that rigidly attach second connecting portion 116 with second receiving element 109. First and second connecting portions 115, 116 may be characterized as portions of stacked layer 110 that are non-deformable in a direction that is parallel to perpendicular axis X.

According to some embodiments, the forces that result from vibrations and/or thermal movement of an aircraft engine (e. g., aircraft engine 106 of FIG. 3A) and that are directed to longitudinal axis Y and/or elevation axis Z of attachment 107 may apply loads to first connecting portion 115 of stacked layer 110. First connecting portion 115 may transmit these forces to second connecting portion 116 over suspension portion 117. The transmission of the forces over suspension portion 117 may cause a shearing deformation of stacked layer 110 in direction of perpendicular axis X, the amplitude of which depends on the intensity of the forces.

If desired, suspension portion 117 may have a predetermined stiffness in direction of longitudinal axis Y and another predetermined stiffness in direction of perpendicular axis X that is smaller than the predetermined stiffness in direction of longitudinal axis Y. If desired, suspension portion 117 may be semi elastic and/or viscoelastic deformable in a direction that is parallel to perpendicular axis X.

For example, as shown in FIG. 7B, stacked layer 110 may have a straight shape. This straight configuration of stacked layer 110 may allow the loads from an aircraft engine that is attached at the first connecting portion 115 to propagate through smooth load paths between sheets 111 and allow the compressive load to be spread over the length, or at least a significant length, of stacked layer 110.

Figure 7C:
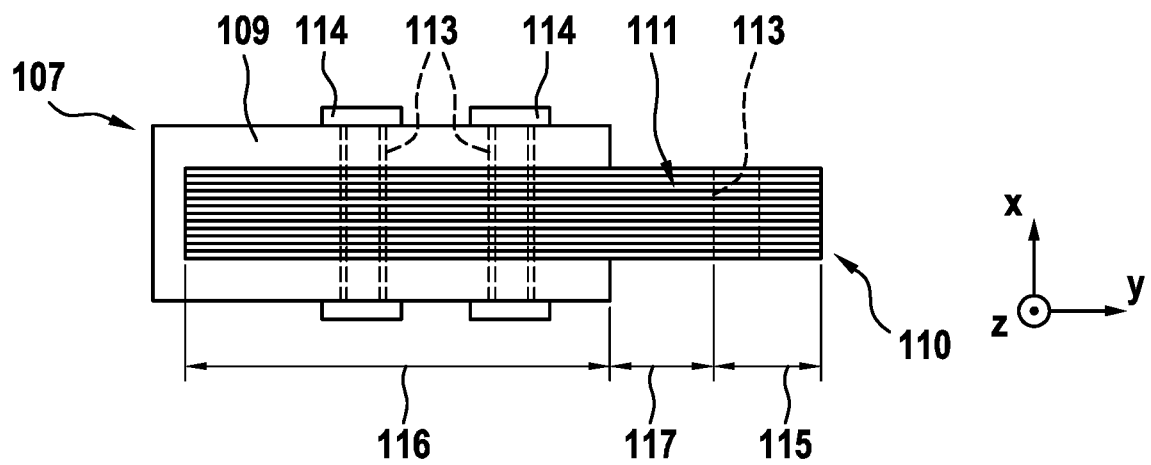

FIG. 7C illustrates a top view of attachment 107 of FIGS. 7A and 7B. Attachment 107 may include fasteners 114 and stacked layer 110. Stacked layer 110 may include sheets 111, three holes 113 through stacked layer 110, first connecting portion 115 and second connecting portion 116.

First connecting portion 115 may include a hole 113 that is adapted for receiving a fastener that is adapted to attach first connecting portion 115 with a first receiving portion of an aircraft engine. Second connecting portion 116 may include two holes 113 that receive two fasteners 114. Stacked layer 110 may include a suspension portion 117 that may be located between first connecting portion 115 and second connecting portion 116.

In some embodiments, loads and moments in direction of longitudinal axis Y and elevation axis Z may be transmitted by fasteners 114 that are under tension/compression stresses. If desired, fasteners 114 may include cables, hinges or springs for creating additional suspension along perpendicular axis X of stacked layer 110.

In some embodiments, the forces that are directed to longitudinal direction X of attachment 107 apply loads to first connecting portion 115 of stacked layer 110. First connecting portion 115 may transmit these forces to second connecting portion 116 over suspension portion 117. The transmission of the forces over suspension portion 117 may cause a shearing deformation of stacked layer 110, the amplitude of which depends on the intensity of the forces.

If desired, suspension portion 117 may have a first predetermined stiffness in direction of longitudinal axis Y and a second predetermined stiffness in direction of perpendicular axis X that is smaller than the first predetermined stiffness in direction of longitudinal axis Y. Suspension portion 117 may be semi elastic and/or viscoelastic deformable in a direction that is parallel to perpendicular axis X, if desired.

As an example, consider the scenario in which stacked layer 110 has a straight shape between first and second connecting portions 115, 116. In this scenario, stacked layer 110 may allow an algebraic sum of the forces that are exerted in direction of perpendicular axis X to be spread in direction of perpendicular axis X of stacked layer 110. These distributed forces may provide a concentrated bending moment on suspension portion 117 at one point. If desired, suspension portion 117 may bend and/or twist about perpendicular axis X of stacked layer 110.

Figure 8A:
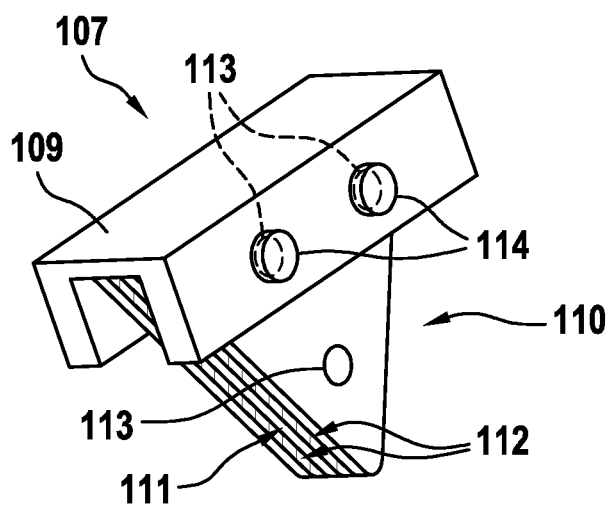
FIG. 8A is a diagram of an illustrative attachment that includes a stacked layer with a triangular shape in accordance with some embodiments.

FIG. 8A illustrates attachment 107 with a stacked layer of triangular-shaped sheets. Attachment 107 may include fasteners 114 and stacked layer 110. Stacked layer 110 may include sheets 111 and holes 113 through stacked layer 110 that each extend in direction of a perpendicular axis (e. g., perpendicular axis X of FIG. 8C).

As shown, sheets 111 may be triangular-shaped. Sheets 111 may be arranged parallel to a longitudinal axis (e. g., longitudinal axis Y of FIG. 8C).

According to some embodiments, stacked layer 110 may include damping material 112 between sheets 111. If desired, damping material 112 may be formed as one or more sheets 111. In other words, one or more sheets 111 may be made from a damping material. Sheets 111 and damping materials 112 may be joined together by fasteners 114. If desired, damping material 112 may be injected (e.g., as a foam) between sheets 111.

If desired, stacked layer 110 may be attached to a first receiving element of an aircraft engine (e.g., aircraft engine 106 of FIG. 2) and to second receiving element 109 of an aircraft structure (e. g., aircraft structure 105 of FIG. 2). For example, the first receiving element may receive one fastener that rigidly attaches first stacked layer 110 with the first receiving element at one end of stacked layer 110. Second receiving element 109 may receive two fasteners 114 that rigidly attach stacked layer 110 with second receiving element 109 at the other end of stacked layer 110.

For example, as shown in FIG. 8A, stacked layer 110 may have a triangular shape. This triangular shape may allow the loads from an aircraft engine to propagate through smooth load paths between sheets 111 and allow the compressive load to be concentrated over the widest unrigid portion of stacked layer 110.

Figure 8B:
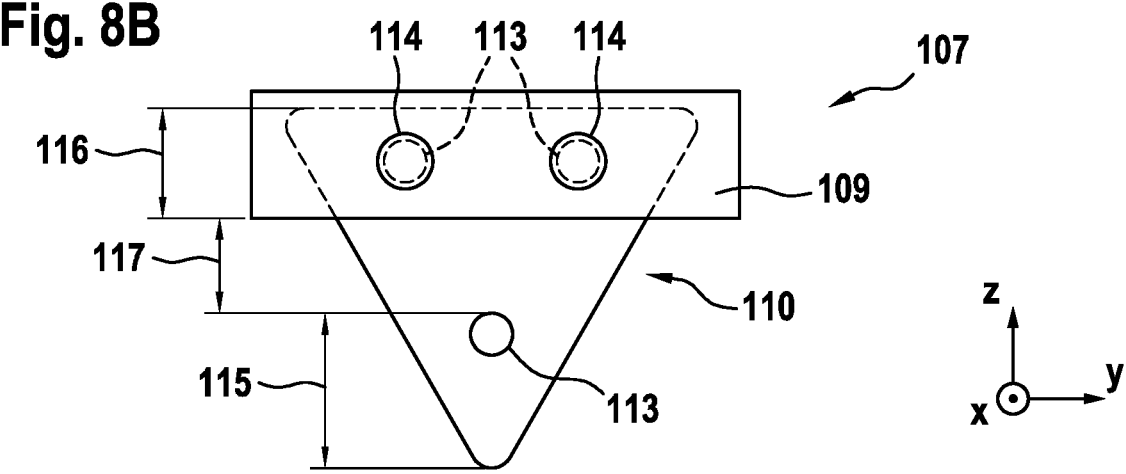
FIG. 8B is a diagram of a plan view of the illustrative attachment of FIG. 8A that includes the stacked layer with the triangular shape in accordance with some embodiments.

FIG. 8B shows a plan view of illustrative attachment 107 of FIG. 8A in accordance with some embodiments. As shown, stacked layer 110 may include three holes 113 through stacked layer 110 that each extend in direction of perpendicular axis X. If desired, stacked layer 110 may include first connecting portion 115, second connecting portion 116, and suspension portion 117 that may be located between first connecting portion 115 and second connecting portion 116.

First connecting portion 115 may include a hole 113 that may be adapted to receive a fastener. For example, first connecting portion 115 may receive one fastener that rigidly attaches first connecting portion 115 with a first receiving element of an aircraft engine. Second connecting portion 116 may include two holes 113 that receive two fasteners 114 that rigidly attach second connecting portion 116 with second receiving element 109 of an aircraft structure.

According to some embodiments, the forces that result from vibrations and/or thermal movement of an aircraft engine (e. g., aircraft engine 106 of FIG. 2), and that are directed to both longitudinal axis Y and elevation axis Z of attachment 107 may apply loads to first connecting portion 115 of stacked layer 110. First connecting portion 115 may transmit these forces to second connecting portion 116 over suspension portion 117. The transmission of the forces to suspension portion 117 causes a shearing deformation of stacked layer 110 in direction of perpendicular axis X, the amplitude of which depends on the intensity of the forces.

If desired, suspension portion 117 may have a predetermined stiffness in direction of longitudinal axis X and a comparatively lower stiffness in direction of perpendicular axis X. if desired, suspension portion 117 may be semi elastic and/or viscoelastic deformable in a direction that is parallel to perpendicular axis X.

For example, as shown in FIG. 8B, stacked layer 110 may have a triangular shape. The triangular shape of stacked layer 110 may allow a compressive load to be spread over suspension portion 117.

Figure 8C:
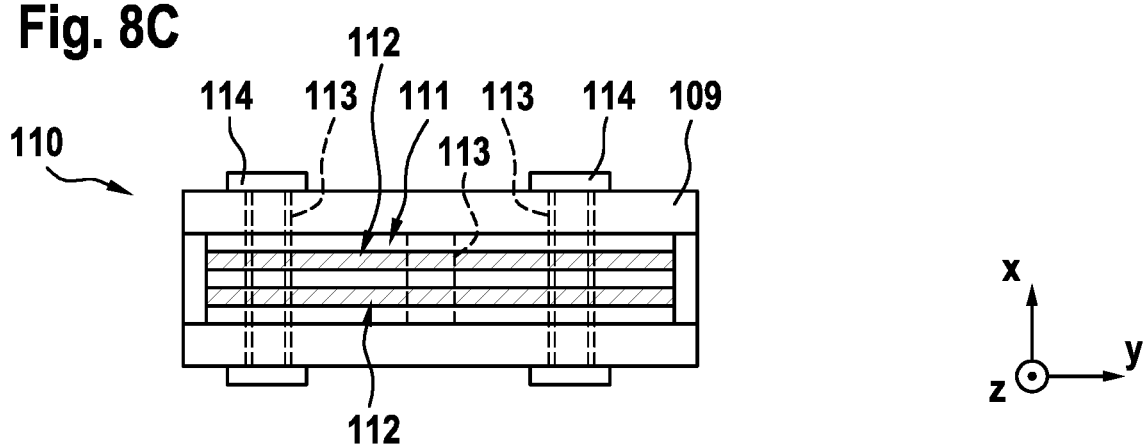
FIG. 8C is a diagram of a bottom view of the illustrative attachment of FIGS. 8A and 8B that includes the stacked layer with the triangular shape in accordance with some embodiments.

FIG. 8C shows a bottom view of illustrative attachment 107 of FIGS. 8A and 8B. The attachment may include fasteners 114 and stacked layer 110. Stacked layer 110 may include sheets 111 and three holes 113 through stacked layer 110. One hole 113 of the three holes 113 is adapted for receiving a fastener (e.g., to rigidly attach stacked layer 110 with a first receiving element of an aircraft engine). The other two holes 113 may receive two fasteners 114 that rigidly attach stacked layer 110 to second receiving element 109.

According to some embodiments, stacked layer 110 may include damping material 112 between sheets 111. If desired, damping material 112 may be formed as a sheet 111. In other words, a sheet of sheets 111 may be made from a damping material. Sheets 111 and damping materials 112 may be joined together by fasteners 114. In some embodiments, damping material 112 may be injected as a foam between sheets 111. Sheets 111 and damping materials 112 may, e. g., be produced by machining of two blocks.

In some embodiments, the forces that are directed to both longitudinal axis Y and elevation axis Z of attachment 107, apply loads to the first connecting portion of stacked layer 110. The first connecting portion may transmit these forces to a second connecting portion over a suspension portion. The transmission of these forces may cause a shearing deformation on sheets 111 and damping materials 112 in direction of perpendicular axis X in the suspension portion, the amplitude of which depends on the intensity of the forces.

This arrangement may prevent damping material 112 and sheets 111 from working in depression. Stacked layer 110 may have a greater stiffness along longitudinal axis Y than along perpendicular axis X. In some embodiments, sheets 111 and damping material 112 may be prestressed in longitudinal direction X by compressing the layers axially (e.g., using fasteners and/or adding holes with additional fasteners).

If desired, the suspension portion may be semi elastic and/or viscoelastic deformable in a direction that is parallel to perpendicular axis X. For example, the suspension portion may bend and/or twist about perpendicular axis X of stacked layer 110.

Figure 9A:
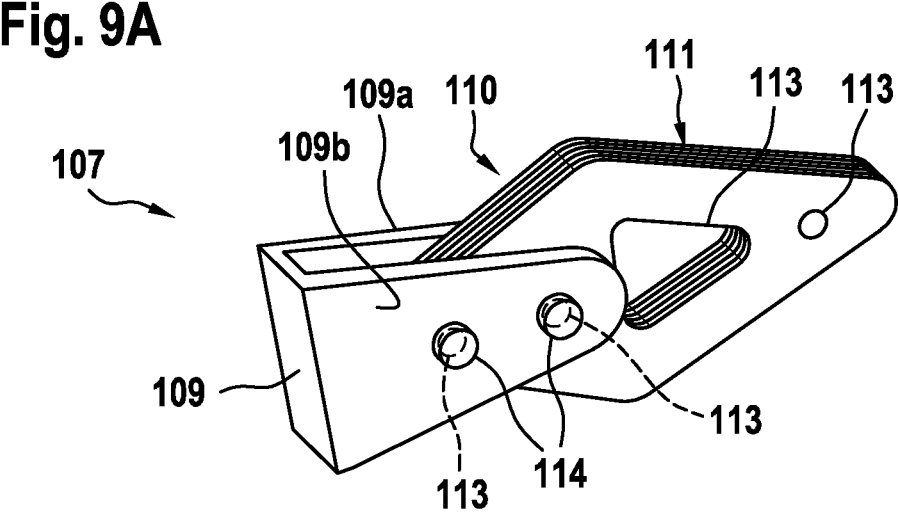
FIG. 9A is a diagram of an illustrative attachment that includes a stacked layer having a suspension portion that includes a cut-out in accordance with some embodiments.

FIG. 9A shows illustrative attachment 107 that includes fasteners 114 and stacked layer 110 having a suspension portion that includes a cut-out in accordance with some embodiments.

Figure 9B:
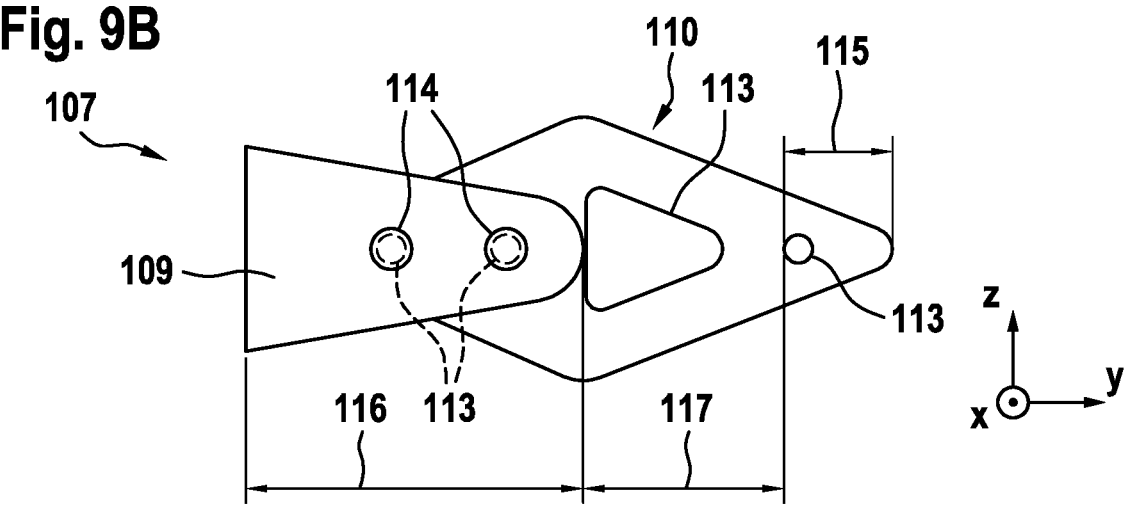
FIG. 9B is a diagram of a plan view of the illustrative attachment of FIG. 9A that includes the stacked layer with the suspension portion that includes the cut-out in accordance with some embodiments.
Figure 9C:
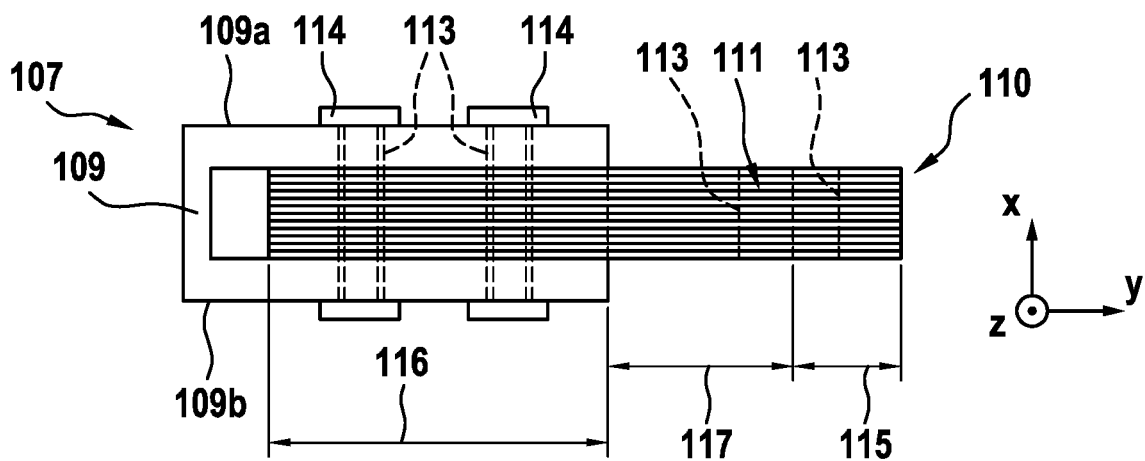
FIG. 9C is a diagram of a top view of the illustrative attachment of FIGS. 9A and 9B that includes the stacked layer with the suspension portion that includes the cut-out in accordance with some embodiments.

Stacked layer 110 may include three holes 113 through stacked layer 110 that each extend in direction of a perpendicular axis (e. g., perpendicular axis X of FIG. 9C) and sheets 111 that are arranged parallel to a longitudinal axis (e. g., longitudinal axis Y of FIG. 9C).

Receiving element 109 may include two prongs 109a, 109b, and stacked layer 110 may be arranged between prongs 109a, 109b. Prongs 109a, 109b may be attached to stacked layer 110 with fasteners 114.

In some embodiments, stacked layer may include a cut-out that represents an additional hole 113 that extends in direction of the perpendicular axis. As shown, hole 113 may have a triangular shape with rounded corners. If desired, hole 113 may have a shape that is non-triangular. For example, hole 113 may have a shape that is rhombic, rectangular, pentagonal, hexagonal, heptagonal, octagonal, etc. with or without rounded corners. As another example, hole 113 may have a shape that is circular, oval, elliptical, etc.

Additional hole 113 may provide a light-weight design for attachment 107 as long as the level of the forces applied to attachment 107 remains below or equal to a predetermined threshold.

If desired, stacked layer 110 may be attached to an aircraft engine (e. g., aircraft engine 106 of FIG. 2) with a first receiving element (e. g., first receiving element 108 of FIG. 2) and to an aircraft structure (e. g., aircraft structure 105 of FIG. 2) with second receiving element 109.

First receiving element 108 may receive one fastener that rigidly attaches stacked layer 110 with the first receiving element at one end of stacked layer 110. Second receiving element 109 may receive two fasteners 114 that rigidly attach stacked layer 110 with second receiving element 109 at the other end of stacked layer 110.

For example, as shown in FIG. 9A, stacked layer 110 may have a rhombic shape with an additional hole 113 between hole 113 that is adapted to be attached to the first receiving element and second receiving element 109.

FIG. 9B shows a plan view of illustrative attachment 107 of FIG. 9A. As shown, attachment 107 may include fasteners 114 and stacked layer 110. Stacked layer 110 may include three holes 113 through stacked layer 110 that each extend in direction of perpendicular axis X.

If desired, stacked layer 110 may include first connecting portion 115 that includes hole 113, second connecting portion 116 that includes two holes 113 that receive two fasteners 114, and suspension portion 117 having an additional hole 113 (i.e., a cut-out) that may be located between first connecting portion 115 and second connecting portion 116.

Attachment 107 may attach an aircraft engine (e.g., aircraft engine 106 of FIG. 2) via a first receiving element (e.g., first receiving element 108 of FIG. 2), stacked layer 110, and second receiving element 109 to an aircraft structure (e.g., aircraft structure 105 of FIG. 2).

According to some embodiments, the forces that result from vibrations and/or thermal movement of the aircraft engine and that are directed to longitudinal axis Y and/or elevation axis Z may apply loads to first connecting portion 115 of stacked layer 110. First connecting portion 115 transmits these forces to second connecting portion 116 over suspension portion 117. The transmission of the forces to suspension portion 117 may cause a shearing deformation of stacked layer 110 in direction of perpendicular axis X, the amplitude of which depends on the intensity of the forces.

If desired, suspension portion 117 may have a first stiffness in direction of longitudinal axis Y and a second stiffness in direction of perpendicular axis X that is smaller than the first stiffness in direction of longitudinal axis Y. Suspension portion 117 may be semi elastic and/or viscoelastic deformable in a direction that is parallel to perpendicular axis X. If desired, suspension portion 117 may bend and/or twist about the perpendicular axis of stacked layer 110.

FIG. 9C show a top view of the illustrative attachment 107 of FIGS. 9A and 9B. If desired, attachment 107 may connect a first receiving element with second receiving element 109. Attachment 107 may include fasteners 114 and stacked layer 110.

Stacked layer 110 may include sheets 111, four holes 113 through stacked layer 110 which include the cut-out, first connecting portion 115, second connecting portion 116, and suspension portion 117. First connecting portion 115 may include a hole 113 that is adapted to receive a fastener. Second connecting portion 116 may include two holes 113 that receive two fasteners 114 which rigidly attach stacked layer 110 with second receiving element 109 between prongs 109a, 109b. Suspension portion 117 may be located between first connecting portion 115 and second connecting portion 116.

In some embodiments, loads and moments in direction of longitudinal axis Y and elevation axis Z from an aircraft engine may be transmitted by fasteners 114 that are under tension/compression stresses. If desired, fasteners 114 may include cables, hinges or springs for creating additional suspension along perpendicular axis X of stacked layer 110 between the aircraft engine and an aircraft structure.

In some embodiments, the forces that result from vibrations and/or thermal movement of the aircraft engine, and that are directed to longitudinal direction X of attachment 107, may apply loads to first connecting portion 115 of stacked layer 110. First connecting portion 115 may transmit these forces to second connecting portion 116 over suspension portion 117. The transmission of the forces to suspension portion 117 causes a shearing deformation of stacked layer 110, the amplitude of which depends on the intensity of the forces.

If desired, suspension portion 117 may have a greater stiffness in direction of longitudinal axis Y than in direction of perpendicular axis X. Thus, suspension portion 117 may be semi elastic and/or viscoelastic deformable in a direction that is parallel to perpendicular axis X.

Figure 10A:
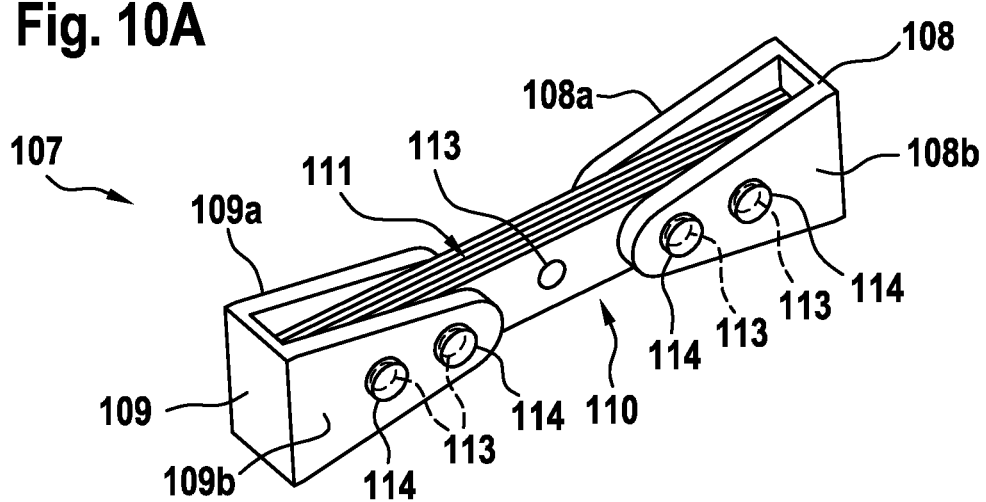
FIG. 10A is a diagram of an illustrative attachment that includes a stacked layer being encompassed by first and second receiving elements in accordance with some embodiments.

FIG. 10A shows an illustrative attachment 107 that may be attached to first and second receiving element 108, 109 in accordance with some embodiments. As shown, attachment 107 may include four fasteners 114 and one stacked layer 110 that includes five holes 113 through stacked layer 110 that each extend in direction of a perpendicular axis (e. g., perpendicular axis X of FIG. 10C). If desired, stacked layer 110 may have four holes 113 or more than five holes 113.

Similarly, first and/or second receiving elements 108, 109 may together have more than four holes 113. For example, first and/or second receiving elements 108, 109 may together have five holes, six holes, seven holes, etc. Accordingly, attachment 107 may have more than four fasteners 114 to attach first and second receiving elements 108, 109 with stacked layer 110.

Figure 10B:
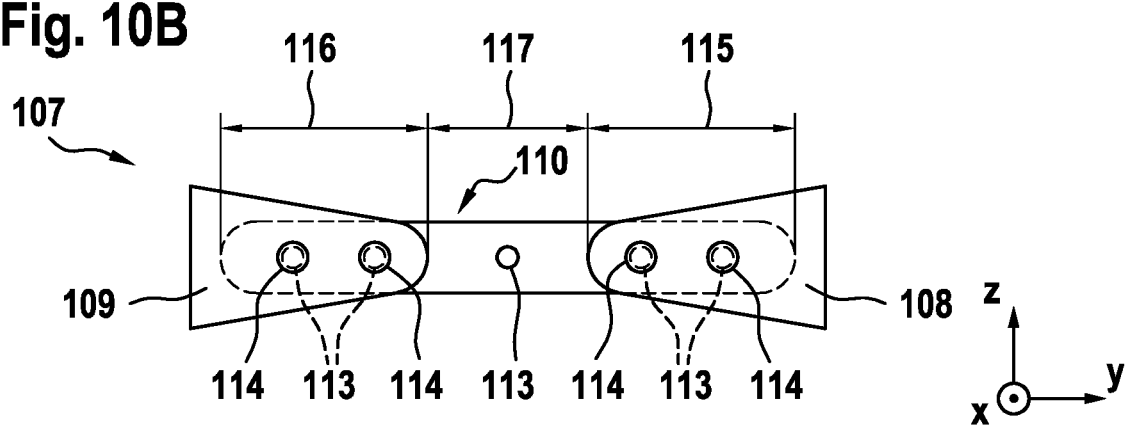
FIG. 10B is a diagram of a plan view of the illustrative attachment of FIG. 10A that includes the stacked layer being encompassed by the first and second receiving elements in accordance with some embodiments.
Figure 10C:
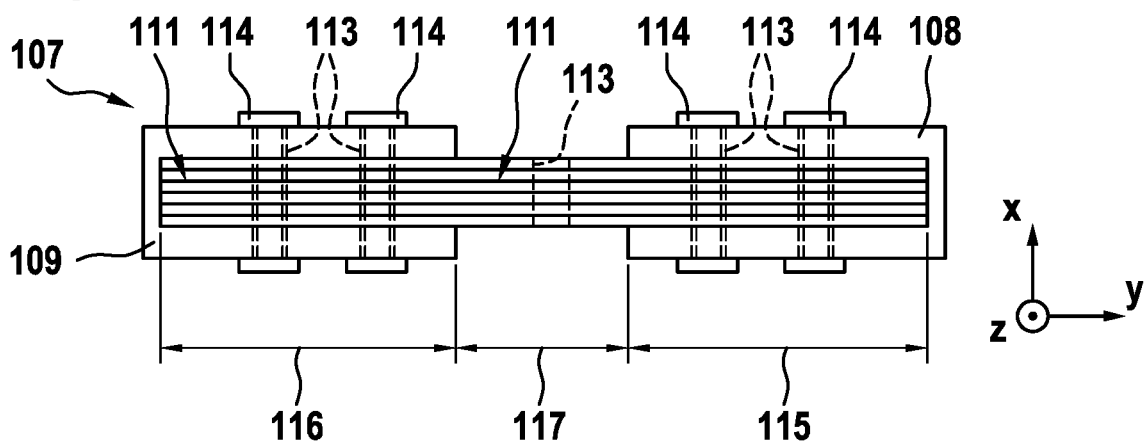
FIG. 10C is a diagram of a top view of the illustrative attachment of FIGS. 10A and 10B that includes the stacked layer being encompassed by the first and second receiving elements in accordance with some embodiments.

Stacked layer 110 may include sheets 111 that are arranged parallel to a longitudinal axis (e. g., longitudinal axis Y of FIG. 10C). Each of first and second receiving elements 108, 109 may include two prongs 108a, 108b, 109a, 109b. Stacked layer 110 may be arranged between prongs 108a, 108b, 109a, 109b.

In some embodiments, first and second receiving elements 108, 109 may encompass respective ends of stacked layer 110 with prongs 108a, 108b, 109a, 109b. Prongs 108a, 108b of first receiving element 108 may be attached to stacked layer 110 with two fasteners 114, and prongs 109a, 109b, and second receiving element 109 may be attached to stacked layer 110 with two fasteners 114.

In some embodiments, stacked layer 110 may include an additional hole 113 that is arranged parallel to remaining four holes 113 of stacked layer 110 between first and second receiving element 108, 109. If desired, the additional hole 113 may receive an additional fastener that attaches a device to stacked layer 110. The device may include an additional aircraft engine, a test unit, or an aircraft engine-based machine, etc. In some embodiments, the additional hole 113 may receive an additional fastener that controls the stiffness of stacked layer 110 in a direction that is parallel to the perpendicular axis.

FIG. 10B shows a plan view of illustrative attachment 107 of FIG. 10A. As shown, attachment 107 may have stacked layer 110 that is attached to first and second receiving elements 108, 109. Stacked layer 110 may include five holes 113 through stacked layer 110 that each extend in direction of perpendicular axis X.

If desired, stacked layer 110 may include first connecting portion 115 that includes two holes 113 and receives two fasteners 114, second connecting portion 116 that includes two holes 113 and receives two fasteners 114, and suspension portion 117 having one hole 113. Suspension portion 117 may be located between first connecting portion 115 and second connecting portion 116.

According to some embodiments, the forces that result from vibrations and/or thermal movement of an aircraft engine (e. g., aircraft engine 106 of FIG. 2), and that are directed to longitudinal axis Y and/or elevation axis Z of attachment 107, may apply loads via fasteners 114 to first connecting portion 115 of stacked layer 110.

First connecting portion 115 may transmit these forces to second connecting portion 116 over suspension portion 117. The transmission of the forces over suspension portion 117 may cause a shearing deformation of stacked layer 110 in direction of perpendicular axis X, the amplitude of which depends on the intensity of the forces.

If desired, suspension portion 117 may have a different stiffness in direction of longitudinal axis Y than in direction of perpendicular axis X. For example, the stiffness in direction of perpendicular axis X may be smaller than the stiffness in direction of longitudinal axis Y. Suspension portion 117 may be semi elastic and/or viscoelastic deformable in the direction that is parallel to perpendicular axis X.

FIG. 10C shows a top view of illustrative attachment 107 of FIGS. 10A and 10B. Attachment 107 may connect first and second receiving elements 108, 109 and include fasteners 114 and a stacked layer. As shown, the stacked layer may include sheets 111, four holes 113 through sheets 111, first and second connecting portions 115, 116, and suspension portion 117.

First connecting portion 115 may have two holes 113 that each receive one fastener 114, and second connecting portion 116 may have two holes 113 that each receive one fastener 114. Suspension portion 117 may be located between first connecting portion 115 and second connecting portion 116 and may have one hole 113.

In some embodiments, loads and moments in direction of longitudinal axis Y and/or elevation axis Z from an aircraft engine may be transmitted by fasteners 114 that may be under tension/compression stresses. If desired, fasteners 114 may include cables, hinges or springs for creating additional suspension along perpendicular axis X.

As an example, consider the scenario in which suspension portion 117 may have one hole 113 that is arranged parallel to remaining four holes 113 through sheets 111 between first and second connecting portions 115, 116. Consider further that hole 113 of suspension portion 117 receives additional fastener 114 for attaching a device that produces forces and moments in longitudinal axis Y and/or elevation axis Z.

In this scenario, stacked layer 110 may allow an algebraic sum of the forces that are exerted in perpendicular axis X to be spread in direction of perpendicular axis X around hole 113 of suspension portion 117. The distributed forces may provide a concentrated bending moment on suspension portion 117 at two points. If desired, suspension portion 117 may bend and/or twist in direction of perpendicular axis X of stacked layer 110 and around hole 113.

Figure 11A:
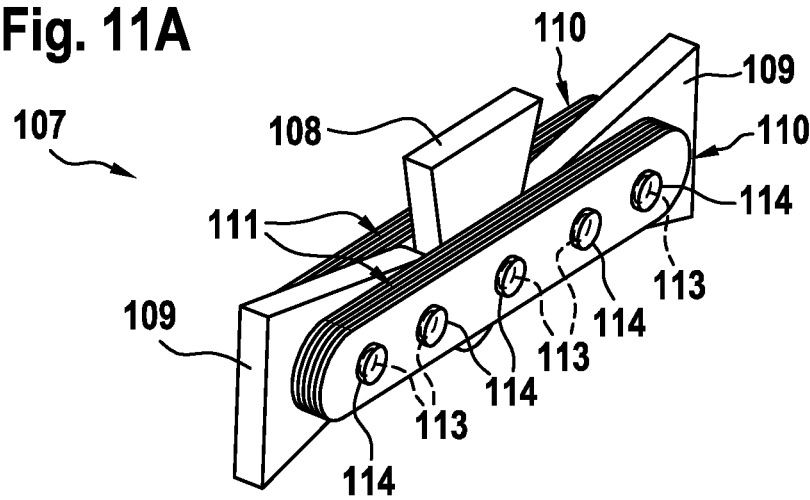
FIG. 11A is a diagram of an illustrative attachment that includes two stacked layers being attached to a first receiving element in the middle and being attached to two second receiving elements on each side of the stacked layers in accordance with some embodiments.

FIG. 11A shows an illustrative attachment 107 with two stacked layers 110 that may be attached to first and second receiving elements 108, 109. As shown, attachment 107 may include two stacked layers 110 that are arranged parallel to a longitudinal axis (e. g., longitudinal axis Y of FIG. 11B). Each one of stacked layers 110 may include five holes 113 through respective stacked layer 110 that each extend in direction of a perpendicular axis (e. g., perpendicular axis X of FIG. 11B), and sheets 111 that are arranged parallel to the longitudinal axis.

If desired, an aircraft structure (e. g., aircraft structure 105 of FIG. 2, FIG. 3A or FIG. 3B) may include two second receiving elements 109. The two second receiving elements 109 may be arranged between the two stacked layers 110 opposing each other at the ends of the two stacked layers 110. Each of the second receiving elements 109 may receive two fasteners 114 that rigidly attach the second receiving elements 109 between the two stacked layers 110, thereby coupling the two stacked layers 110 with each other.

In some embodiments, an aircraft engine (e. g., aircraft engine 106 of FIG. 2, FIG. 3A or FIG. 3B) may have first receiving element 108 that is attached to stacked layer 110 between these two second receiving elements 109.

Figure 11B:
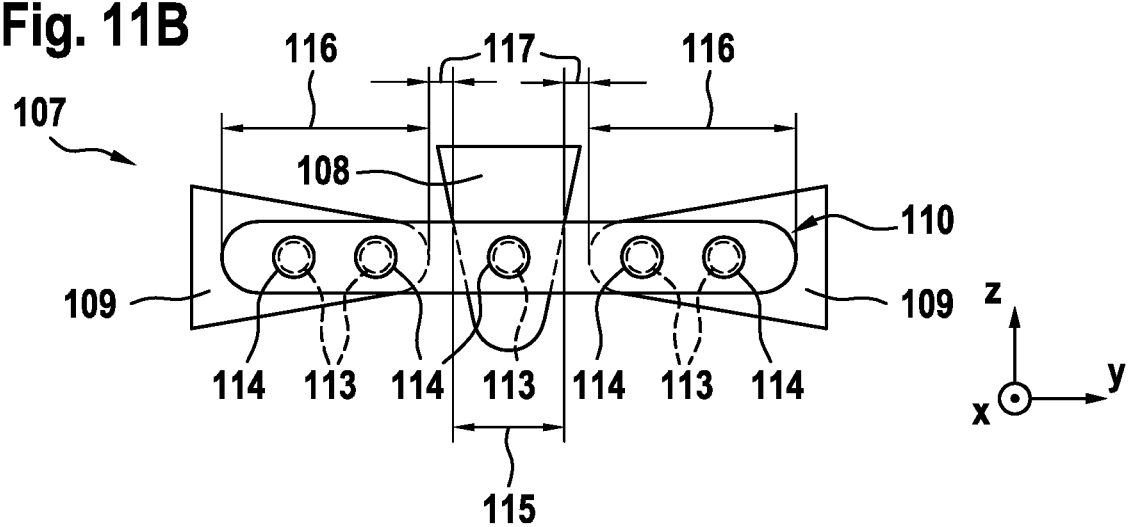
FIG. 11B is a diagram of a plan view of the illustrative attachment of FIG. 11A that includes two stacked layers being attached to the first receiving element in the middle and being attached to two second receiving elements on each side of the stacked layers in accordance with some embodiments.

FIG. 11B shows a plan view of illustrative attachment 107 of FIG. 11A. As shown, each of the two stacked layers 110 may include five holes 113 that each extend in direction of perpendicular axis X, first connecting portion 115 that includes one hole 113 that receives one fastener 114, two second connecting portions 116 that are positioned opposing to each other at the ends of stacked layer 110, and two suspension portions 117 that may be located between first connecting portion 115 and respective second connecting portions 116. Each one of the two second connecting portions 116 may include two holes 113 that receive two fasteners 114.

Each of second connecting portions 116 may receive two fasteners 114 that rigidly attach the two stacked layers 110 with second receiving elements 109 that are arranged between the two stacked layers 110. Between these two second connecting portions 116, the two stacked layers 110 may include first connecting portion 115. First connecting portion 115 may receive one fastener 114 that rigidly attaches first connecting portion 115 with first receiving element 108 that is clamped between the two stacked layers 110.

If desired, the forces that are applied to an aircraft engine that is attached to receiving element 108 and that are directed to longitudinal axis Y and/or elevation axis Z of attachment 107 apply loads to first connecting portion 115 of stacked layer 110. First connecting portion 115 may spread these forces to second connecting portions 116 over suspension portions 117. The transmission of the forces to suspension portions 117 causes a shearing deformation of stacked layer 110 in direction of perpendicular axis X, the amplitude of which depends on the intensity of the forces.

If desired, each of suspension portions 117 may have a predetermined stiffness in direction of longitudinal axis Y and another predetermined stiffness in direction of perpendicular axis X that is smaller than the predetermined stiffness in direction of longitudinal axis Y. Each of suspension portions 117 may be semi elastic and/or viscoelastic deformable in a direction that is parallel to perpendicular axis X.

Figure 11C:
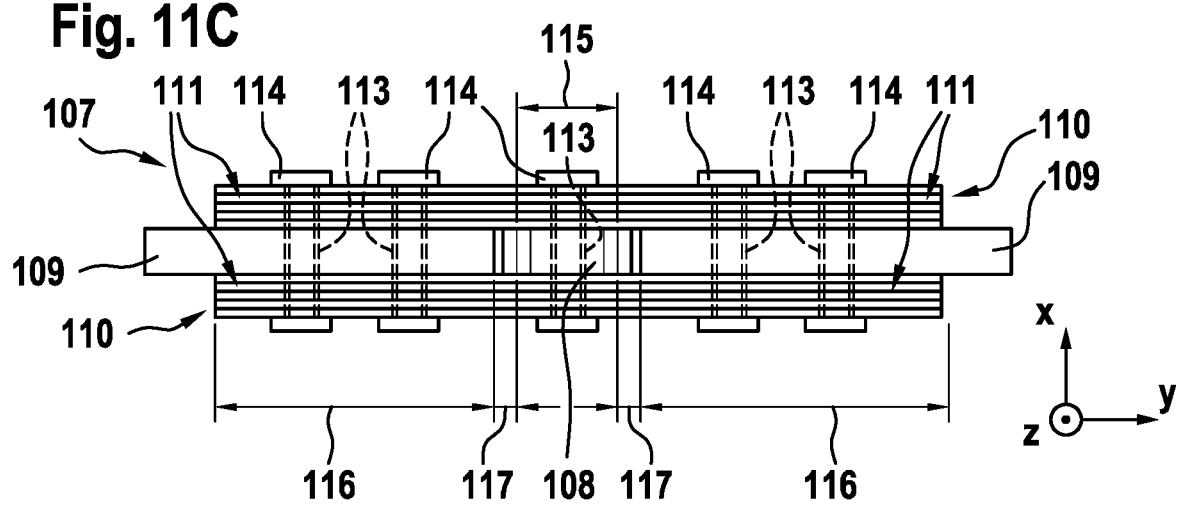
FIG. 11C is a diagram of an illustrative bottom view of the attachment of FIGS. 11A and 11B that includes two stacked layers being attached to the first receiving element in the middle and being attached to two second receiving elements on each side of the stacked layers in accordance with some embodiments.

FIG. 11C illustrates a bottom view of attachment 107 of FIGS. 11A and 11B. Attachment 107 may include five fasteners 114 and two stacked layers 110. Each one of stacked layers 110 may include at least two sheets and five holes 113 through respective stacked layer 110. Stacked layer 110 may have first connecting portion 115 that includes one hole 113, two second connecting portions 116 that are arranged at the opposing ends of stacked layers 110, and two suspension portions 117 that may be located between first connecting portion 115 and respective second connecting portions 116. Each of second connecting portions 116 may include two holes 113.

First receiving element 108 may be arranged between the two stacked layers 110 at first connecting portion 115 such that holes 113 of the two stacked layers 110 are aligned with each other and with a hole through first receiving element 108. The aligned holes 113 may receive fastener 114 that rigidly attaches first receiving element 108 at first connecting portion 115 between the two stacked layers 110. In other words, the attachment 107 achieves a double lap shear function at the connection with first receiving element 108.

Two second receiving elements 109 may be arranged between the two stacked layers 110 at respective second connecting portions 116 such that holes 113 of the two stacked layers 110 are aligned with each other and with the holes through the two second receiving elements 109. The aligned holes 113 may receive fasteners 114 that rigidly attach the two second receiving elements 109 at the two second connecting portions 116 between the two stacked layers 110. In other words, the attachment 107 achieves a double lap shear function at the connection with second receiving element 109.

In some embodiments, loads and moments in direction of longitudinal axis Y and/or elevation axis Z from an aircraft engine via first receiving element 108, stacked layer 110, and second receiving elements 109 to an aircraft structure may be transmitted by fasteners 114 that are under tension/compression stresses. If desired, fasteners 114 may include cables, hinges or springs for creating additional suspension along perpendicular axis X of stacked layer 110.

For example, the forces that result from vibrations and/or thermal movement of an aircraft engine (e.g., aircraft engine 106 of FIG. 2) in direction of longitudinal axis Y and/or elevation axis Z apply loads to first connecting portion 115 of stacked layer 110. First connecting portion 115 may spread these forces to the two second connecting portions 116 over suspension portions 117. The transmission of the forces over suspension portion 117 causes a shearing deformation of stacked layer 110, the amplitude of which depends on the intensity of the forces.

If desired, suspension portion 117 may have a straight shape that may allow an algebraic sum of the forces that are exerted in direction of perpendicular axis X to be concentrated in direction of perpendicular axis X. Said concentrated forces may provide a bending moment on the suspension portion 117 at one point. If desired, suspension portion 117 may bend and/or twist in direction of perpendicular axis X of stacked layer 110.

Figure 12A:
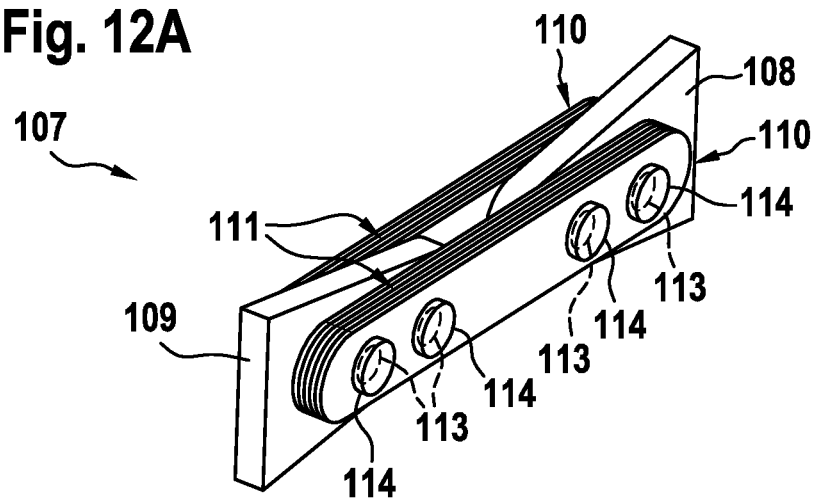
FIG. 12A is a diagram of an illustrative attachment that includes two stacked layers and first and second receiving elements arranged between the two stacked layers in accordance with some embodiments.

FIG. 12A shows an illustrative attachment 107 with two stacked layers 110 that may be attached to first and second receiving elements 108, 109. The two stacked layers 110 may be arranged parallel to each other and to a longitudinal axis (e.g., longitudinal axis Y of FIG. 12B).

Figure 12B:
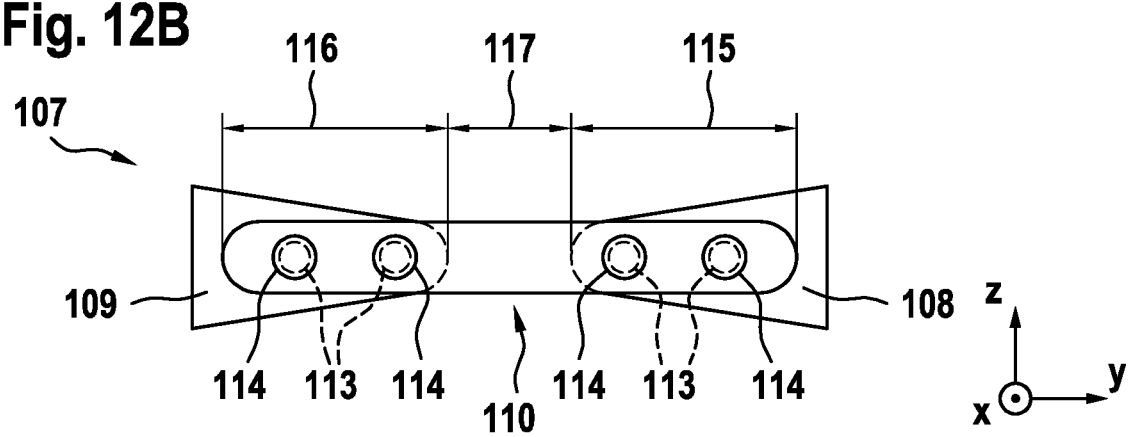
FIG. 12B is a diagram of a plan view of the illustrative attachment of FIG. 12A that includes two stacked layers and first and second receiving elements arranged between the two stacked layers in accordance with some embodiments.

Each one of stacked layers 110 may include four holes 113 through stacked layer 110 that each extend in direction of a perpendicular axis (e.g., perpendicular axis X of FIG. 12B). Each one of stacked layers 110 may have at least two sheets 111 that are arranged parallel to the longitudinal axis.

In some embodiments, each of two stacked layers 110 may be attached to an aircraft engine (e. g., aircraft engine 106 of FIG. 2, FIG. 3A or FIG. 3B) with first receiving element 108 and to an aircraft structure (e. g., aircraft structure 105 of FIG. 2, FIG. 3A or FIG. 3B) with second receiving element 109.

First and second receiving element 108, 109 may be arranged between the two stacked layers 110. First receiving element 108 may receive two fasteners 114 that rigidly attach first receiving element 108 at one end arranged between the two stacked layers 110. Second receiving element 109 may receive two fasteners 114 that rigidly attach second receiving element 109 at the other end arranged between the two stacked layers 110.

If desired, the forces that result from vibrations and/or thermal movement of an aircraft engine (e. g., aircraft engine 106 of FIG. 2, FIG. 3A, or FIG. 3B) in direction of longitudinal axis and/or elevation axis (e.g., longitudinal axis Y and/or elevation axis Z of FIG. 12B) may apply loads to each stacked layer 110 via first receiving element 108. Each stacked layer 110 may transmit these forces to an aircraft structure (e. g., aircraft structure 105 of FIG. 2, FIG. 3A, or FIG. 3B) over second receiving element 109. The transmission of the forces may cause a shearing deformation of stacked layer 110, the amplitude of which depends on the intensity of the forces.

FIG. 12B shows a plan view of illustrative attachment 107 of FIG. 12A. Attachment 107 may include two stacked layers 110. Stacked layers 110 may each include four holes 113 that each extend in direction of perpendicular axis X, first connecting portion 115 that includes two holes 113, second connecting portion 116 that includes two holes 113, and suspension portion 117 that may be located between first connecting portion 115 and second connecting portion 116.

If desired, first and second receiving elements 108, 109 may be arranged between two stacked layers 110. Two holes 113 of first connecting portion 115 of the two stacked layers 110 may be aligned with each other and with holes in first receiving element 108. The two holes of first connecting portion 115 may each receive one fastener 114 that rigidly attaches first receiving element 108 at first connecting portion 115 between the two stacked layers 110.

Two holes of second connecting portion 116 of the two stacked layers 110 may be aligned with each other and with holes in second receiving element 109. The two holes of second connecting portion 116 may receive two fasteners that rigidly attach second receiving element 109 at second connecting portion 116 between the two stacked layers 110.

According to some embodiments, the forces that result from vibrations and/or thermal movement of an aircraft engine (e. g., aircraft engine 106 of FIG. 2, FIG. 3A or FIG. 3B), and that are directed to longitudinal axis Y and/or elevation axis Z may apply loads to first connecting portion 115 of stacked layer 110 via first receiving element 108. First connecting portion 115 may transmit these forces to second connecting portion 116 over suspension portion 117. The transmission of the forces over suspension portion 117 may cause a shearing deformation of stacked layer 110 in direction of perpendicular axis X, the amplitude of which depends on the intensity of the forces.

If desired, suspension portion 117 may have a first stiffness in direction of longitudinal axis Y and a second stiffness in direction of perpendicular axis X that is smaller than the first stiffness in direction of longitudinal axis Y. Suspension portion 117 may be semi elastic and/or viscoelastic deformable in a direction that is parallel to perpendicular axis X.

Figure 12C:
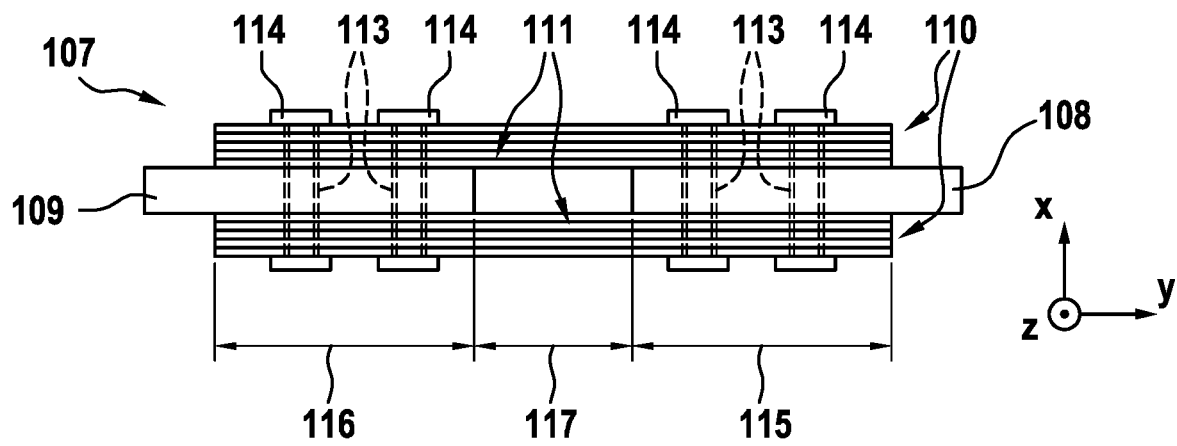
FIG. 12C is a diagram of a top view of the illustrative attachment of FIGS. 12A and 12B that includes two stacked layers and first and second receiving elements arranged between the two stacked layers in accordance with some embodiments.

FIG. 12C illustrates a top view of illustrative attachment 107 of FIGS. 12A and 12B. As shown, attachment 107 may include four fasteners 114 and two stacked layers 110. Each stacked layer 110 may include at least two sheets 111 and four holes 113 that are distributed among first connecting portion 115 and second connecting portion 116.

For example, first connecting portion 115 of the two stacked layers 110 may have two holes 113, and second connecting portion 116 may have two holes 113. Stacked layers 110 may include suspension portion 117 that may be located between first connecting portion 115 and second connecting portion 116.

If desired, first and second receiving elements 108, 109 may be arranged between the two stacked layers 110. First connecting portion 115 may receive two fasteners 114 that rigidly attach first receiving element 108 at first connecting portion 115 between the two stacked layers 110. Second connecting portion 116 may receive two fasteners that rigidly attach second receiving element 109 at second connecting portion 116 between the two stacked layers 110.

In other words, the attachment 107 achieves a first double lap shear function at the connection with first receiving element 108 and a second double lap shear function at the connection with second receiving element 109.

In some embodiments, forces that act on first receiving element 108 in direction of longitudinal axis Y and/or elevation axis may apply loads to first connecting portion 115 of stacked layer 110. First connecting portion 115 may transmit these forces to suspension portion 117 and from there to second connecting portion 116. The transmission of the forces to suspension portion 117 may cause a shearing deformation of stacked layer 110, the amplitude of which depends on the intensity of the forces.

If desired, suspension portion 117 may have a stiffness in direction of longitudinal axis Y and a stiffness in direction of perpendicular axis X that is smaller than the stiffness in direction of longitudinal axis Y. Suspension portion 117 may be semi elastic and/or viscoelastic deformable in a direction that is parallel to perpendicular axis X.

If desired, suspension portion 117 may bend and/or twist about perpendicular axis X of stacked layer 110.

Figure 13A:
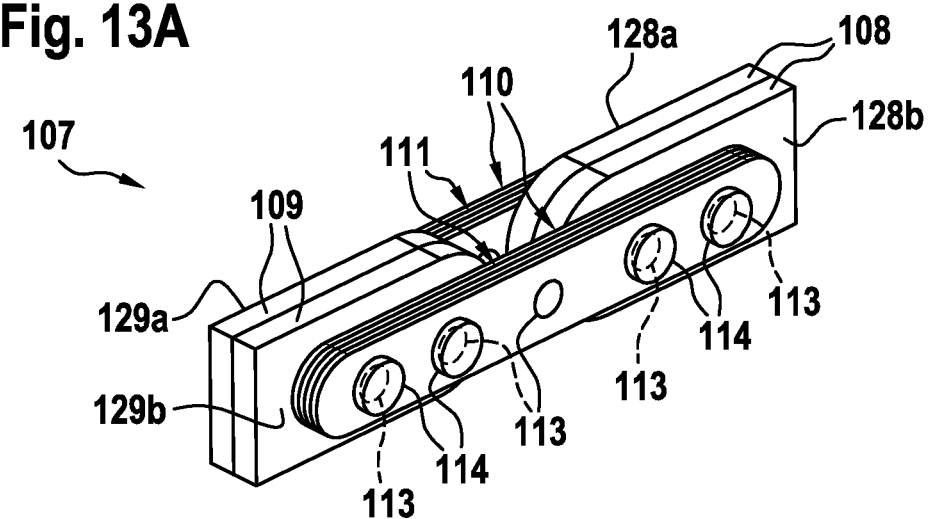
FIG. 13A is a diagram of an illustrative attachment that includes two stacked layers and two receiving elements with two sheets arranged between the two stacked layers in accordance with some embodiments.

FIG. 13A is a diagram of illustrative attachment 107 that may be attached to first and second receiving elements 108, 109 that each include two sheets 128a, 128b, 129a, 129b. Attachment 107 may include two stacked layers 110.

Figure 13B:
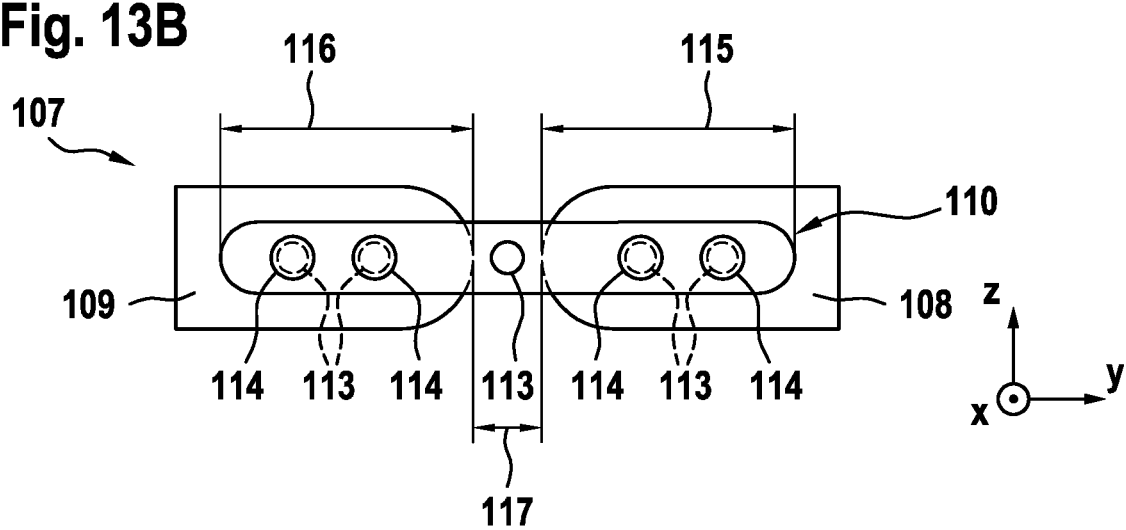
FIG. 13B is a diagram of a plan view of the illustrative attachment of FIG. 13A that includes two stacked layers and two receiving elements with two sheets arranged between the two stacked layers in accordance with some embodiments.

Each one of stacked layers 110 may include five holes 113 through stacked layer 110 that each extend in direction of a perpendicular axis (e. g., perpendicular axis X of FIG. 13B) and sheets 111 that are arranged parallel to a longitudinal axis (e.g., longitudinal axis Y of FIG. 13B). In some embodiments, each one of stacked layers 110 may include four holes 113 instead of five holes 113 through stacked layer 110. If desired, a different number of holes through stacked layer 110 may be chosen. For example, stacked layer 110 may have six holes, seven holes, eight holes, nine holes, etc.

As shown, first and second receiving elements 108 and 109 may each include two sheets 128a, 128b, 129a, 129b that may be arranged between two stacked layers 110. In other words, each one of the first and second receiving elements 108, 109 together with the two stacked layers 110 may achieve a combined double lap shear function.

In a first embodiment, an aircraft structure (e. g., aircraft structure 105 of FIG. 2, FIG. 3A, or FIG. 3B) may include two receiving elements 108, 109 with sheets 128a, 128b, 129a, 129b. The two receiving element 108, 109 may be positioned opposing each other at the ends of stacked layer 110. Each of the receiving elements 108, 109 may receive two fasteners 114 that rigidly attach each of stacked layers 110 with the two receiving elements 108, 109 that are arranged between the two stacked layers 110.

In this first embodiment, an aircraft engine (e. g., aircraft engine 106 of FIG. 2, FIG. 3A or FIG. 3B) may be attached to the two stacked layers 110 with an additional receiving element between these two receiving elements 108, 109 (not shown). For example, the fifth hole in the middle of the two stacked layers 110 may be aligned with a hole in the additional receiving element that may receive a fastener 114 that rigidly attaches the two stacked layers 110 with the additional receiving element.

In a second embodiment, an aircraft engine (e.g., aircraft engine 106 of FIG. 2, 3A, or 3B) may be attached to the two stacked layers 110 with receiving element 108, and an aircraft structure may include receiving element 109 to which the two stacked layers 110 are attached. In this embodiment, the fifth hole 113 in the middle of the two stacked layers 110 may be omitted.

Alternatively, the fifth hole 113 in the middle of the two stacked layers 110 may receive a fastener that may further control the stiffness of the two stacked layers 110 in a direction that is perpendicular to a longitudinal extension of the two stacked layers (e.g., in direction of perpendicular axis X of FIG. 13B that is perpendicular to longitudinal axis Y).

FIG. 13B shows a plan view of illustrative attachment 107 of FIG. 13A. Attachment 107 may include fasteners 114 and two stacked layers 110. The two stacked layers 110 may each include five holes 113 that extend in direction of perpendicular axis X. If desired, the two stacked layers 110 may include four holes 113 instead of five holes. For example, hole 113 in the middle of the two stacked layers 110 may be omitted.

In a first embodiment, a first connecting portion that includes one hole 113 in the middle of each one of the two stacked layers 110 may receive one fastener that rigidly attaches a receiving element of an aircraft engine between the two stacked layers 110. Two second connecting portions 115, 116 that are positioned opposing each other at the ends of stacked layer 110 may rigidly attach two receiving elements 108, 109 of an aircraft structure between the two stacked layers 110.

In this first embodiment, two suspension portions 117 may be located between the first connecting portion and each one of the two second connecting portions 115, 116. Each of the two second connecting portions 115, 116 may include two holes 113 that receive two fasteners 114.

In a second embodiment, first connecting portion 115 that includes two holes 113 in each one of the two stacked layers 110 may receive two fasteners 114 that rigidly attach first receiving element 108 of an aircraft engine between the two stacked layers 110. Second connecting portion 116 that has two holes 113 in each of the two stacked layers 110 may receive two fasteners 114 that rigidly attach second receiving elements 109 between the two stacked layers 110. In this second embodiment, a suspension portion 117 may be located between first connecting portion 115 and second connecting portion 116.

If desired, the forces that are directed to both longitudinal axis Y and elevation axis Z may apply loads to the first connecting portion of stacked layer 110. The first connecting portion may spread these forces to the second connecting portion(s) over suspension portion(s) 117. The transmission of the forces to suspension portion(s) 117 may cause a shearing deformation of stacked layer 110 in direction of perpendicular axis X, the amplitude of which depends on the intensity of the forces.

If desired, suspension portion(s) 117 may have a stiffness in direction of longitudinal axis Y and a stiffness in direction of perpendicular axis X that is smaller than the stiffness in direction of longitudinal axis Y. If desired, suspension portion(s) 117 may be semi elastic and/or viscoelastic deformable in a direction that is parallel to perpendicular axis X.

Figure 13C:
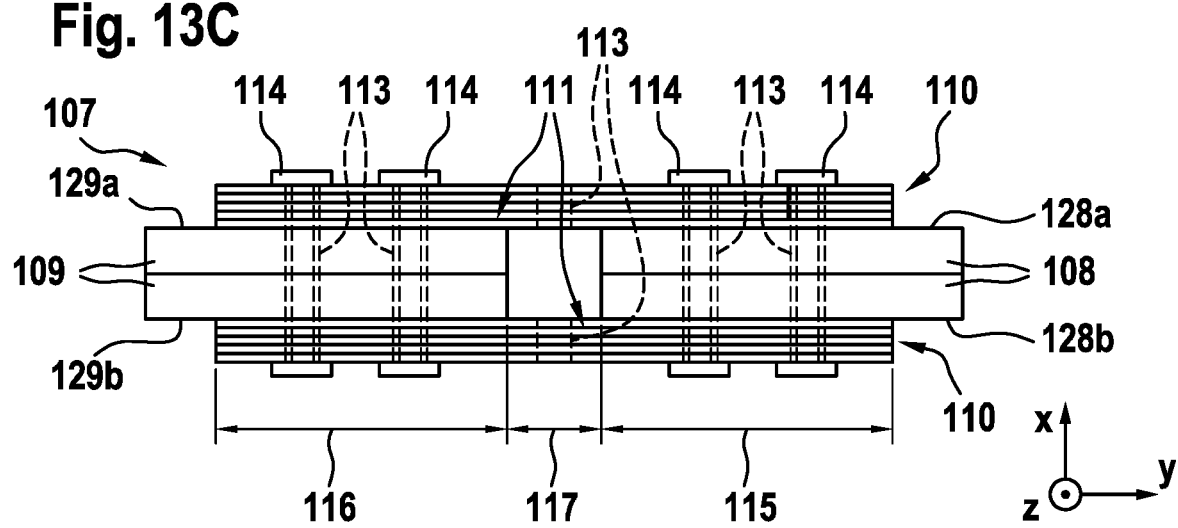
FIG. 13C is a diagram of a top view of the illustrative attachment of FIGS. 13A and 13B that includes two stacked layers and two receiving elements with two sheets arranged between the two stacked layers in accordance with some embodiments.

FIG. 13C shows a top view of illustrative attachment 107 of FIGS. 13A and 13B. Attachment 107 may connect a first receiving element with two second receiving elements 108, 109. If desired, attachment 107 may connect a first receiving element 108 with a second receiving element 109.

As shown, attachment 107 may include four fasteners 114 and two stacked layers 110. If desired, attachment 107 may include five or more fasteners 114.

In a first embodiment, each one of stacked layers 110 may include sheets 111 with five holes 113 through stacked layer 110. For example, a first connecting portion in the middle of the two stacked layers 110 may include one hole 113 that receives one fastener 114. Two second connecting portions 115, 116 may be attached to two sheets 128a, 128b, 129a, 129b that are arranged between the two stacked layers 110. Two suspension portions may be located between the first connecting portion and the two second connecting portions 115, 116. Each of the two second connecting portions 115, 116 may include two holes 113 that receive two fasteners 114.

In a second embodiment, each one of stacked layers 110 may include sheets 111, with four or five holes 113 through the stacked layer 110. For example, first and second connecting portions 115, 16 may each include two holes 113 that receive two fasteners 114. A suspension portion 117 that may be located between the first and second connecting portions 115, 116.

In some embodiments, loads and moments in direction of longitudinal axis Y and/or elevation axis Z from an aircraft engine may be transmitted by fasteners 114 that are under tension/compression stresses. If desired, fasteners 114 may include cables, hinges or springs for creating additional suspension along perpendicular axis X of stacked layer 110, between the aircraft engine and an aircraft structure.

In the second embodiments described above, the forces that result from vibrations and/or thermal movement of an aircraft engine in a direction that is parallel to longitudinal axis Y and/or elevation axis Z of attachment 107 may apply loads to first connecting portion 115 of stacked layer 110. First connecting portion 115 may spread these forces to second connecting portion 116 over suspension portions 117. The transmission of the forces over suspension portion 117 may cause a shearing deformation of stacked layer 110, the amplitude of which depends on the intensity of the forces.

As an example, consider the scenario in which suspension portion 117 may have a straight shape with hole 113 that is arranged parallel to remaining four holes 113 of stacked layer 110 between first and second connecting portions 115, 116. Hole 113 of suspension portion 117 may receive an additional fastener for attaching a device that produces forces and moments both in longitudinal axis Y and elevation axis Z. In this scenario, said configuration of stacked layer 110 may allow an algebraic sum of the forces that are exerted in direction of perpendicular axis X to be spread in direction of perpendicular axis X around hole 113 of suspension portion 117. Said distributed forces may provide a concentrated bending moment on suspension portion 117 at two points. If desired, suspension portion 117 may bend and/or twist in direction of perpendicular axis X of stacked layer 110 and around hole 113.

Figure 14A:
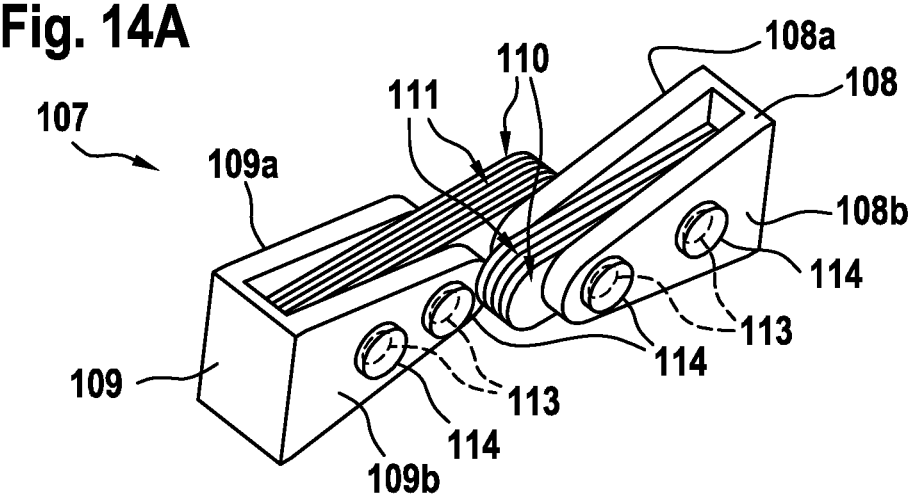
FIG. 14A is a diagram of an illustrative attachment that includes two stacked layers that are attached to each other in accordance with some embodiments.

FIG. 14A is a diagram of illustrative attachment 107 that may be attached to first and second receiving element 108, 109 in accordance with some embodiments. As shown, attachment 107 may include four fasteners 114 and two stacked layers 110.

Figure 14B:
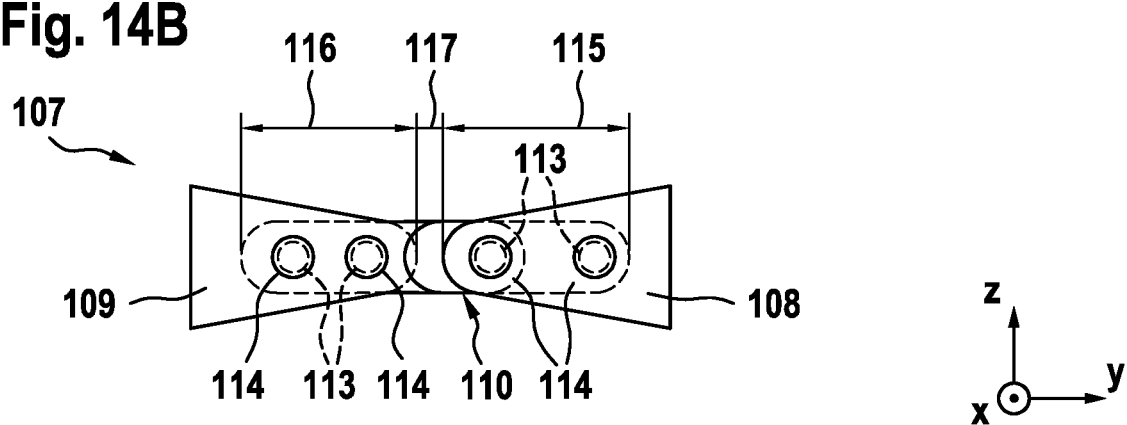
FIG. 14B is a diagram of a plan view of the illustrative attachment of FIG. 14A that includes two stacked layers that are attached to each other in accordance with some embodiments.

One of the two stacked layers 110 may have three holes 113 and sheets 111 that are arranged parallel to a longitudinal axis (e. g., longitudinal axis Y of FIG. 14B). The other one of the two stacked layers 110 may have two holes 113 and sheets 111 that are arranged parallel to the longitudinal axis.

First receiving element 108 may include two prongs 108a, 108b. As shown, the stacked layer 110 with the two holes 113 may be arranged between these prongs 108a, 108b. Second receiving element 109 may include two prongs 109a, 109b, and the stacked layers 110 with the three holes may be arranged between prongs 109a, 109b.

In some embodiments, one stacked layer 110 of the two stacked layers 110 may be attached to prongs 108a, 108b of first receiving element 108. For example, two holes 113 of stacked layer 110 may receive two of the four fasteners 114.

The other stacked layer 110 of the two stacked layers 110 may be attached to prongs 109a, 109b of second receiving element 109. For example, two of the three holes 113 of stacked layer 110 may receive two of the four fasteners 114.

Stacked layer 110 that is between prongs 109a, 109b of second receiving element 109 may include one hole 113 that is aligned with one hole 113 of stacked layer 110 that is arranged between prongs 108a, 108b. Stacked layer 110 that is between prongs 109a, 109b of second receiving element 109 may receive one fastener 114 that rigidly attaches the stacked layer 110 with prong 108a, stacked layer 110 that is between prongs 108a, 108b and second prong 108b.

FIG. 14B shows a plan view of illustrative attachment 107 of FIG. 14A. As shown, attachment 107 may include four fasteners 114 and two stacked layers 110. One of the two stacked layers 110 may include three holes 113. The other one of the two stacked layers 110 may have two holes 113.

First connecting portion 115 may be associated with both stacked layers 110, while second connecting portion 116 may only be associated with the stacked layer 110 that has three holes. Suspension portion 117 may be located between first connecting portion 115 and second connecting portion 116 and be associated with both stacked layers 110.

In some embodiments, the stacked layer 110 with the two holes 113 may be attached to first receiving element 108. The other stacked layer 110 with the three holes 113 may be attached to second receiving element 109.

One hole 113 of the stacked layer 110 with the two holes may be aligned with one hole 113 of stacked layer 110 that has three holes 113. If desired, a fastener 114 may rigidly attach the stacked layer with the three holes 113 with the stacked layer with the two holes 113.

Figure 14C:
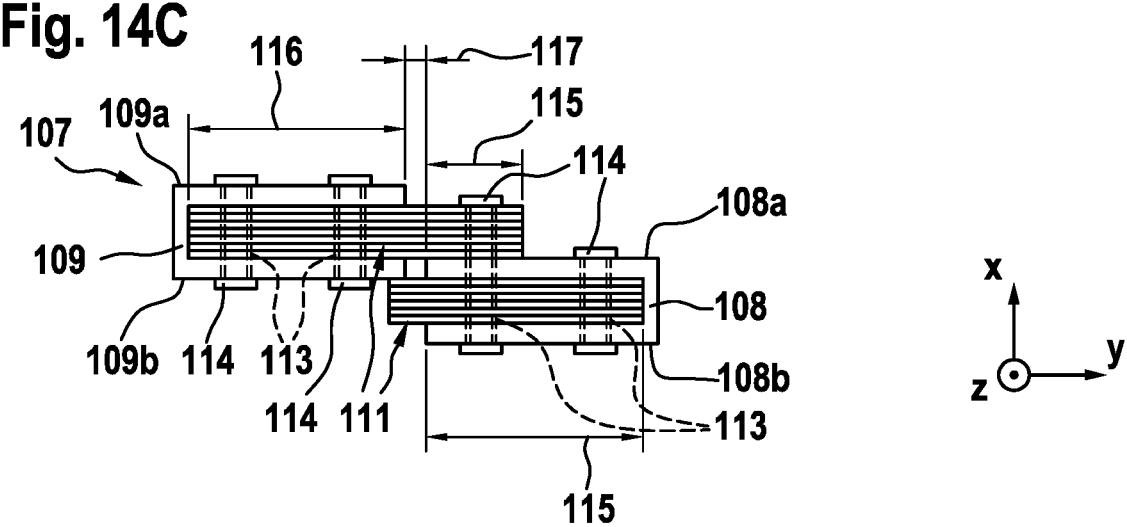
FIG. 14C is a diagram of a top view of the illustrative attachment of FIGS. 14A and 14B that includes two stacked layers that are attached to each other in accordance with some embodiments.

FIG. 14C shows a top view of illustrative attachment 107 of FIGS. 14A and 14B. Attachment 107 may include four fasteners 114 and two stacked layers of sheets 111.

One of the two stacked layers may include three holes 113 through the stacked layer. If desired, the stacked layer with three holes may have first connecting portion 115 that includes one hole 113, second connecting portion 116 that includes two holes 113, and suspension portion 117 that may be located between first connecting portion 115 and second connecting portion 116.

The other one of the two stacked layers may include two holes 113 through the stacked layer, first connecting portion 115 that may include two holes 113 that receive two fasteners 114, and suspension portion 117 that may be located between first connecting portion 115 and second connecting portion 116 of the stacked layer that includes three holes 113.

In some embodiments, the stacked layer with two holes may be attached to prongs 108a, 108b of first receiving element 108 with two of four fasteners 114. The stacked layer with three holes 113 may be attached to prongs 109a, 109b of second receiving element 109 with two fasteners 114.

First connecting portion 115 of the stacked layer with three holes 113 may include one hole 113 that is aligned with one hole 113 of the stacked layer that is arranged between prongs 108a, 108b. If desired, a fastener 114 may rigidly attach first connecting portion 115 of the stacked layer with three holes 113 (i.e., the first connecting portion 115 of the stacked layer that is arranged between prongs 109a, 109b) with prong 108a, the stacked layer with two holes 113 (i.e., the stacked layer that is arranged between prongs 108a, 108b) and prong 108b. Such connection between two stacked layers allows to provide two suspension portions 117 that are arranged parallel to each other.

As an example, consider the scenario in which an aircraft engine transmits forces to first receiving element 108. Consider further that the forces are directed parallel to longitudinal axis Y and/or elevation axis Z and apply loads to first connecting portion 115 of the stacked layer that is arranged between prongs 108a, 108b.

In this scenario, first connecting portion 115 may transmit these forces to fastener 114 that rigidly attaches the two stacked layers with prongs 108a and 108b. The transmission of the forces to said fastener 114 may cause a shearing deformation of the two stacked layers in suspension portion 117. If desired, suspension portion 117 may bend and/or twist in direction of perpendicular axis X.

It should be noted that the above-described embodiments are merely described for illustration purposes, but not in order to restrict the present invention thereto. Instead, multiple modifications and variations of the presented embodiments are possible and should, therefore, also be considered as being part of the invention.

For example, the attachments of FIGS. 6A to 14C may include a different number of stacked layers which may be arranged parallel to each other. The number of stacked layers may depend on parameters such as the amplitude of the loads from an aircraft engine that is attached to an aircraft structure with the attachments, the cross-sectional area of the sheets, the loads that the suspension portion must withstand, and the amount of vibration damping that has to be applied to the suspension portion.

As another example, the stacked layers of FIG. 6A to 14C may have a varying number of sheets. If desired, the number of sheets stacked together, their geometrical shape, the material they are made of, the thickness, the width, and/or the length of the sheets and the position of the fasteners may be adjusted. As a result, the stiffness of the stacked layers of FIGS. 6A to 14C in the individual directions may be adjustable in a wide range and may provide the expected characteristics depending on the individual requirements.

For example, the stacked layer 110 with the kinked shaped sheets 111 of FIGS. 6A to 6C may have an additional hole in suspension portion 117 that may receive a fastener. The fastener in the additional hole may fasten the sheets together, thereby adjusting the semi elasticity and/or the viscoelasticity of the suspension portion 117.

Moreover, attachments 107 of FIGS. 6A to 14C are described as being used for attaching an aircraft engine to an aircraft structure. However, attachments 107 may be used for attaching any component of an aircraft to the aircraft structure. For example, attachments 107 may attach gearboxes or other equipment to the aircraft structure.

REFERENCE LIST 100 airplane
101 rudder
102 elevator
103, 104 wing
105 aircraft structure
106 aircraft engine
107 attachment
108 first receiving element
108a, 108b prong
109 second receiving element
109a, 109b prong
110 stacked layer
111 sheets
112 damping material
113 holes
114 fasteners
115 first connecting portion
116 second connecting portion
117 suspension portion
118 displacement
120 coupling rod
121 coupling rod
128a, 128b, 129a, 129b sheets
X perpendicular axis
Y longitudinal axis
Z elevation axis

What is claimed is:

1. An attachment for attaching an aircraft engine having a first receiving element to an aircraft structure having a second receiving element, comprising:
at least three fasteners; and
a stacked layer that comprises:
at least two sheets that are arranged parallel to a longitudinal axis of the attachment, wherein the at least two sheets are made of composite materials,
at least three holes through the stacked layer that each extend in direction of a perpendicular axis that is perpendicular to the longitudinal axis,
a first connecting portion that includes a first hole of the at least three holes, wherein the first hole receives a first fastener of the at least three fasteners that is configured to rigidly attach the first connecting portion with the first receiving element,
a second connecting portion that includes second and third holes of the at least three holes, wherein the second hole receives a second fastener of the at least three fasteners, wherein the third hole receives a third fastener of the at least three fasteners, and wherein the second and third fasteners are configured to rigidly attach the second connecting portion with the second receiving element, and
a suspension portion that is located between the first connecting portion and the second connecting portion and that is viscoelastic deformable in a direction that is parallel to the perpendicular axis.

2. The attachment of claim 1, wherein the suspension portion has a first stiffness in direction of the longitudinal axis and a second stiffness in direction of the perpendicular axis that is smaller than the first stiffness.

3. The attachment of claim 2, wherein the suspension portion further comprises:
an additional hole through the stacked layer that extends in direction of the perpendicular axis.

4. The attachment of claim 3, wherein the additional hole receives an additional fastener that controls the second stiffness.

5. The attachment of claim 3, wherein the additional hole receives an additional fastener that attaches a device to the suspension portion.

6. The attachment of claim 1, wherein the stacked layer is kinked between the first and second connecting portions.

7. The attachment of claim 1, wherein the stacked layers configured to be encompassed by the first receiving element at the first connecting portion.

8. The attachment of claim 1, wherein the stacked layer is configured to be encompassed by the second receiving element at the second connecting portion.

9. The attachment of claim 1 further comprising:
an additional stacked layer that comprises:
at least two additional sheets that are arranged parallel to the longitudinal axis; and
at least two additional holes, wherein a fourth hole of the at least two additional holes receives at least one of the first, second, or third fastener that couples the stacked layer with the additional stacked layer.

10. The attachment of claim 9, wherein the at least two additional holes are arranged parallel to the at least three holes of the stacked layer.

11. The attachment of claim 10, wherein the additional stacked layer is configured to be arranged between first and second prongs of the first receiving element, and wherein the first fastener is configured to rigidly attach the first connecting portion of the stacked layer with the first prong, the additional stacked layer and the second prong.

12. The attachment of claim 10, wherein fifth and sixth holes of the at least two additional holes of the additional stacked layer are aligned with the second and third hole of the stacked layer and wherein the second and third fasteners are configured to rigidly attach the second receiving element at the second connecting portion between the stacked layer and the additional stacked layer.

13. The attachment of claim 10, wherein a fifth hole of the at least two additional holes of the additional stacked layer is aligned with the first hole of the stacked layer and wherein the first fastener is configured to rigidly attach the first receiving element at the first connecting portion between the stacked layer and the additional stacked layer.

14. The attachment of claim 1, wherein the at least two sheets further comprise:
a sheet made from a damping material.

15. The attachment of claim 1, wherein the composite materials comprise a material having at least two different constituent materials.

16. The attachment of claim 15, wherein the at least two different constituent materials comprise a matrix material and a transforming material.

17. The attachment of claim 16, wherein the transforming material comprises reinforcement.

18. The attachment of claim 17, wherein the reinforcement comprises fibers and the matrix material comprises polymeric material.

19. An attachment for attaching an aircraft engine having a first receiving element to an aircraft structure having a second receiving element, comprising:
a first fastener, a second fastener, and a third fastener; and
a stacked layer comprising:
two sheets arranged parallel to a longitudinal axis of the attachment, wherein the two sheets are made of a composite material,
a first hole, a second hole and a third hole, each of the holes extending through the stacked layer in direction of a perpendicular axis that is perpendicular to the longitudinal axis,
a first connecting portion that includes the first hole, wherein the first hole receives the first fastener that is configured to rigidly attach the first connecting portion with the first receiving element,
a second connecting portion that includes the second and third holes, wherein the second hole receives the second fastener, wherein the third hole receives the third fastener, and wherein the second and third fasteners are configured to rigidly attach the second connecting portion with the second receiving element, and
a suspension portion located between the first connecting portion and the second connecting portion and that is viscoelastically deformable in a direction that is parallel to the perpendicular axis.

20. The attachment of claim 19, wherein the composite material comprises two different constituent materials.

* * * * *